United States Patent
Ooi et al.

(10) Patent No.: US 9,927,790 B2
(45) Date of Patent: Mar. 27, 2018

(54) TRANSMISSION DEVICE, TRANSMISSION SYSTEM, AND MONITORING CONTROL METHOD

(71) Applicant: FUJITSU LIMITED, Kawasaki-shi, Kanagawa (JP)

(72) Inventors: Masaki Ooi, Kanazawa (JP); Yasuhiro Yamamori, Hakusan (JP); Tatsuya Abe, Hakusan (JP); Masayuki Tsuda, Nomi (JP)

(73) Assignee: FUJITSU LIMITED, Kawasaki (JP)

( * ) Notice: Subject to any disclaimer, the term of this patent is extended or adjusted under 35 U.S.C. 154(b) by 570 days.

(21) Appl. No.: 14/511,537

(22) Filed: Oct. 10, 2014

(65) Prior Publication Data
US 2015/0153718 A1 Jun. 4, 2015

(30) Foreign Application Priority Data
Nov. 29, 2013 (JP) ................. 2013-248618

(51) Int. Cl.
G06F 11/00 (2006.01)
G06F 11/20 (2006.01)
(Continued)

(52) U.S. Cl.
CPC ...... *G05B 19/0428* (2013.01); *H04L 41/0695* (2013.01); *G05B 2219/24093* (2013.01)

(58) Field of Classification Search
CPC ............ G06F 11/2038; G06F 11/2097; G06F 11/2025; G06F 11/2028; G06F 11/2092;
(Continued)

(56) References Cited

U.S. PATENT DOCUMENTS 5,790,797 A 8/1998 Shimada et al.
8,074,099 B2 * 12/2011 Arata .................. G06F 11/2025
714/13
(Continued)

FOREIGN PATENT DOCUMENTS

JP 8-288945 11/1996
JP 2000-250624 9/2000
(Continued)

OTHER PUBLICATIONS

Reitblatt et al., FatTire: declarative fault tolerance for software-defined networks, Aug. 2013, 6 pages.*
(Continued)

*Primary Examiner* — Thuy Dao
(74) *Attorney, Agent, or Firm* — Staas & Halsey LLP

(57) ABSTRACT

A transmission device includes a transmission processing circuitry configured to transmit and receive signals to and from another transmission device through a transmission path, a first memory, a first processor coupled to the first memory, configured to perform monitoring control of the transmission processing circuitry, a second memory, and a second processor coupled to the second memory, configured to perform monitoring control of the transmission processing circuitry on behalf of the first processor when a failure occurs in the first processor, wherein when a failure occurs in a monitoring control system that performs monitoring control of the other transmission device, the second processor performs monitoring control of the other transmission device by transmitting and receiving control signals to and from the other transmission device.

6 Claims, 22 Drawing Sheets

(51) Int. Cl.
*G06F 17/30* (2006.01)
*G05B 19/042* (2006.01)
*H04L 12/24* (2006.01)

(58) Field of Classification Search
CPC ............ G06F 11/1464; G06F 11/2005; G06F 11/2046; G06F 15/177; H04L 41/0663; H04L 41/0695; F16K 37/0083; G05B 19/0428; G05B 2219/24093
See application file for complete search history.

(56) References Cited

U.S. PATENT DOCUMENTS

| | | | | |
|---|---|---|---|---|
| 8,423,515 | B2 * | 4/2013 | Vivian | G06F 11/2097 707/674 |
| 8,468,383 | B2 * | 6/2013 | Bower | G06F 1/30 714/4.1 |
| 8,468,390 | B2 * | 6/2013 | Callaway | G06F 11/1641 714/15 |
| 8,725,693 | B2 * | 5/2014 | Lee | G06F 11/2097 707/640 |
| 8,909,977 | B2 * | 12/2014 | Morosan | G06F 11/2028 705/37 |
| 9,524,221 | B2 * | 12/2016 | Li | G06F 11/2038 |
| 2003/0065799 | A1 * | 4/2003 | Kitamura | H04L 12/2856 709/230 |
| 2004/0077345 | A1 * | 4/2004 | Turner | H04W 28/06 455/423 |
| 2008/0178037 | A1 * | 7/2008 | Hof | G06F 11/2028 714/4.11 |
| 2008/0201055 | A1 * | 8/2008 | Maeda | G01R 31/3606 701/102 |
| 2008/0276222 | A1 * | 11/2008 | Yamagami | G06F 11/1441 717/124 |
| 2010/0100475 | A1 * | 4/2010 | Callaway | G06F 11/1641 705/37 |
| 2011/0128145 | A1 * | 6/2011 | Todd | G06F 19/323 340/539.11 |
| 2012/0030323 | A1 * | 2/2012 | Matsuno | G06F 11/2023 709/221 |
| 2013/0290770 | A1 * | 10/2013 | Callaway | G06F 11/1641 714/3 |
| 2015/0082302 | A1 * | 3/2015 | Cheng | G06F 9/45533 718/1 |

FOREIGN PATENT DOCUMENTS

| | | |
|---|---|---|
| JP | 2004-336658 | 11/2004 |
| JP | 2013-187806 | 9/2013 |

OTHER PUBLICATIONS

Suganuma et al., Distributed and fault-tolerant execution framework for transaction processing, May 2011, 12 pages.*
Japanese Office Action Jul. 11, 2017, in corresponding Japanese Patent Application No. 2013-248618.

* cited by examiner

FIG. 7

| UNIT | SLOT | IMPLEMENTATION INFORMATION<br>1: IMPLEMENTED<br>0: NOT IMPLEMENTED | FAILURE INFORMATION<br>1: FAILURE<br>0: NO FAILURE |
|---|---|---|---|
| CONTROL UNIT | #0 | 1 | 0 |
| | #1 | 1 | 0 |
| SWITCH UNIT | | 1 | 0 |
| TRANSMISSION PROCESSING UNIT | #1 | 1 | 0 |
| | #2 | 1 | 0 |
| | ⋮ | ⋮ | ⋮ |
| | #N | 0 | 0 |

FIG. 11A

| SLOT NUMBER/PORT NUMBER | IP ADDRESS | MAC ADDRESS |
|---|---|---|
| 1/1 | 10.10.10.3 | 11:22:33:44:10:03 |
| 1/2 | 10.10.10.3 | 11:22:33:44:10:04 |
| 3/5 | 0.0.0.0 | 00:00:00:00:00:00 |
| 3/10 | 0.0.0.0 | 00:00:00:00:00:00 |

FIG. 11B

| SLOT NUMBER/PORT NUMBER | IP ADDRESS | MAC ADDRESS |
|---|---|---|
| 2/3 | 10.10.10.1 | 22:44:66:88:10:01 |
| 2/6 | 10.10.10.1 | 22:44:66:88:10:02 |
| 4/2 | 10.10.10.5 | aa:bb:cc:dd:10:05 |
| 4/3 | 10.10.10.5 | aa:bb:cc:dd:10:06 |

FIG. 11C

| SLOT NUMBER/PORT NUMBER | IP ADDRESS | MAC ADDRESS |
|---|---|---|
| 5/1 | 10.10.10.3 | 44:66:88:aa10:03 |
| 5/3 | 10.10.10.3 | 44:66:88:aa10:04 |
| 6/6 | 0.0.0.0 | 00:00:00:00:00:00 |
| 6/7 | 0.0.0.0 | 00:00:00:00:00:00 |

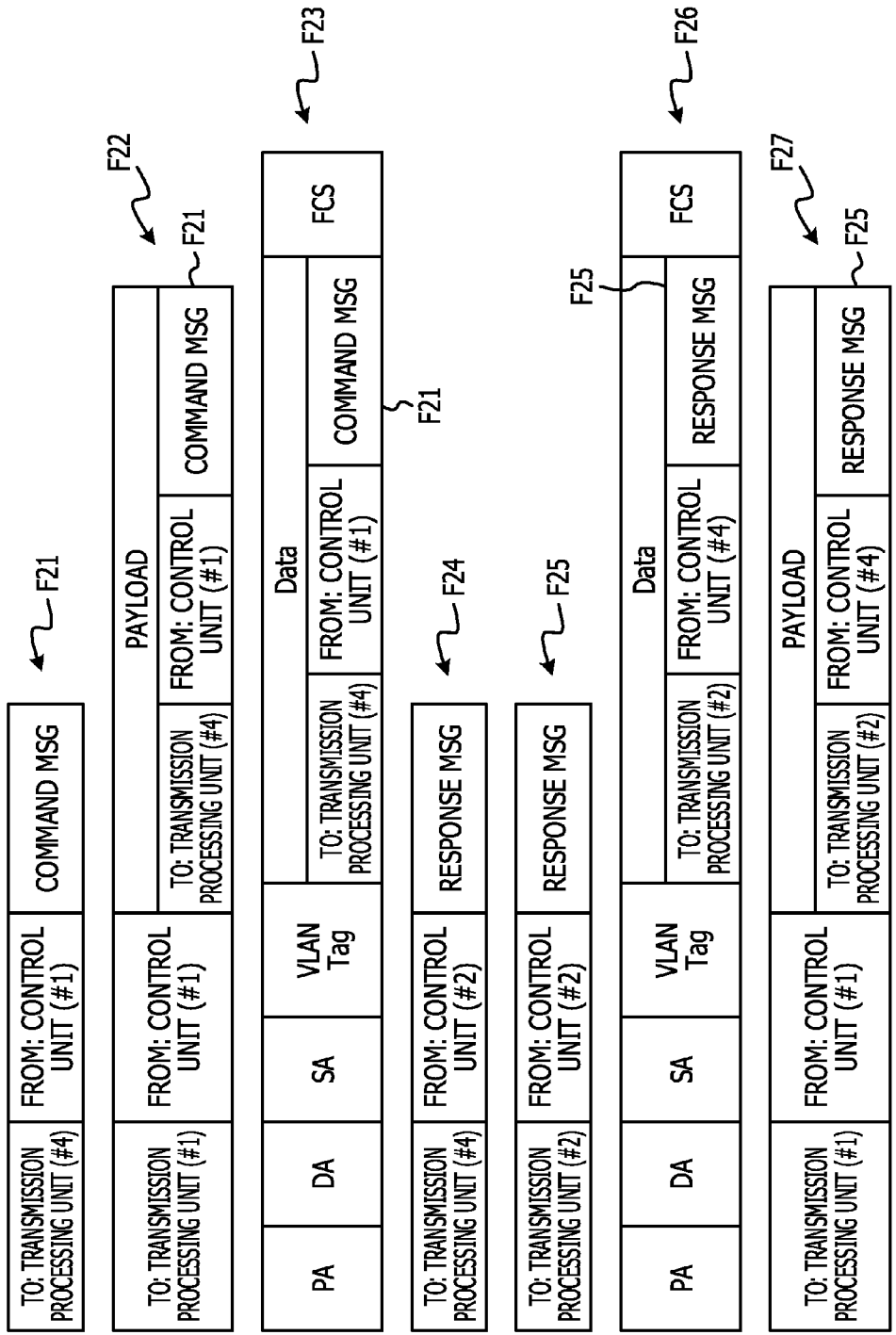

TRANSMISSION DEVICE, TRANSMISSION SYSTEM, AND MONITORING CONTROL METHOD

CROSS-REFERENCE TO RELATED APPLICATION

This application is based upon and claims the benefit of priority of the prior Japanese Patent Application No. 2013-248618, filed on Nov. 29, 2013, the entire contents of which are incorporated herein by reference.

FIELD

The embodiments discussed herein are related to a transmission device, a transmission system, and a monitoring control method.

BACKGROUND

The functions of transmission devices such as Layer 2 switches and communication lines contained therein have become diversified with an increase in demand for communication, and monitoring control performed within transmission devices has become complex. The transmission devices each include, for example, transmission processing units that each perform transmission processing for a main signal, a control unit that performs monitoring control of each transmission processing unit, and so forth. In addition, the main signal is contained in, for example, an Ethernet (registered trademark, the same shall apply hereafter) frame or the like.

The control unit performs, for example, various kinds of setting processing operations on the transmission processing units, and collects pieces of information indicating various kinds of alarms from the transmission processing units. The control unit is connected to a network management device that manages individual transmission devices within a network, through a local area network (LAN) or the like.

An administrator of the network manages a plurality of transmission devices by operating the network management device. In order to identify a failure factor, the network management device collects various kinds of logs from, for example, the control units in the respective transmission devices, and collects communication states (error rates or the like) of communication lines. Therefore, in a case where a failure occurs in the control unit within one of the transmission devices, it becomes difficult to manage the corresponding transmission device, and a problem is caused in the operation of the network.

In order to avoid such a situation, the transmission devices each have the redundant configuration of the control unit. In other words, in each of the transmission devices, two systems of a control unit of an operational system and a control unit of a backup system are provided. Accordingly, in a case where a failure occurs in the control unit of the operational system, the control unit of the backup system monitors and controls the individual transmission processing units, on behalf of the control unit of the operational system in which the failure occurs. In addition, as examples of the failure in the control unit, a failure in a processor such as an embedded central processing unit (CPU) (CPU Halt is included) and communication failures with the network management device and one of the transmission processing units are cited.

For example, in Japanese Laid-open Patent Publication No. 2004-336658, in regard to the monitoring control of the transmission devices, a point that a change in the state information of a port transmitted from a node adjacent to a node of a failure occurrence is detected and the node of a failure occurrence is identified based on connection relationship information between network elements has been disclosed. In addition, in Japanese Laid-open Patent Publication No. 2000-250624, a point that, within a communication control device, a control unit monitors the states of other individual units has been disclosed.

SUMMARY

According to an aspect of the invention, a transmission device includes a transmission processing circuitry configured to transmit and receive signals to and from another transmission device through a transmission path, a first memory, a first processor coupled to the first memory, configured to perform monitoring control of the transmission processing circuitry, a second memory, and a second processor coupled to the second memory, configured to perform monitoring control of the transmission processing circuitry on behalf of the first processor when a failure occurs in the first processor, wherein when a failure occurs in a monitoring control system that performs monitoring control of the other transmission device, the second processor performs monitoring control of the other transmission device by transmitting and receiving control signals to and from the other transmission device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a table illustrating examples of implementation information and failure information of each unit;

FIGS. 11A to 11C are tables illustrating address tables held by transmission devices in respective nodes;

FIG. 19B is a configuration diagram illustrating frames illustrated in FIG. 19A.

DESCRIPTION OF EMBODIMENTS

A control unit in which a failure occurs is replaced with another control unit in which no failure exists, by a maintenance work. However, since transmission devices within a network are individually installed in station buildings in a plurality of regions over a wide range, maintenance works for the transmission devices are not swiftly performed after a failure occurrence, in some cases.

Accordingly, in a case where a failure further occurs in an in-use control unit before the replacement of a control unit, a problem that the monitoring control of the corresponding transmission device is interrupted occurs. Therefore, the present technology provides a transmission device, a transmission system, and a monitoring control method which are capable of avoiding interruption of monitoring control.

(Configuration of Transmission System)

Figure 1:
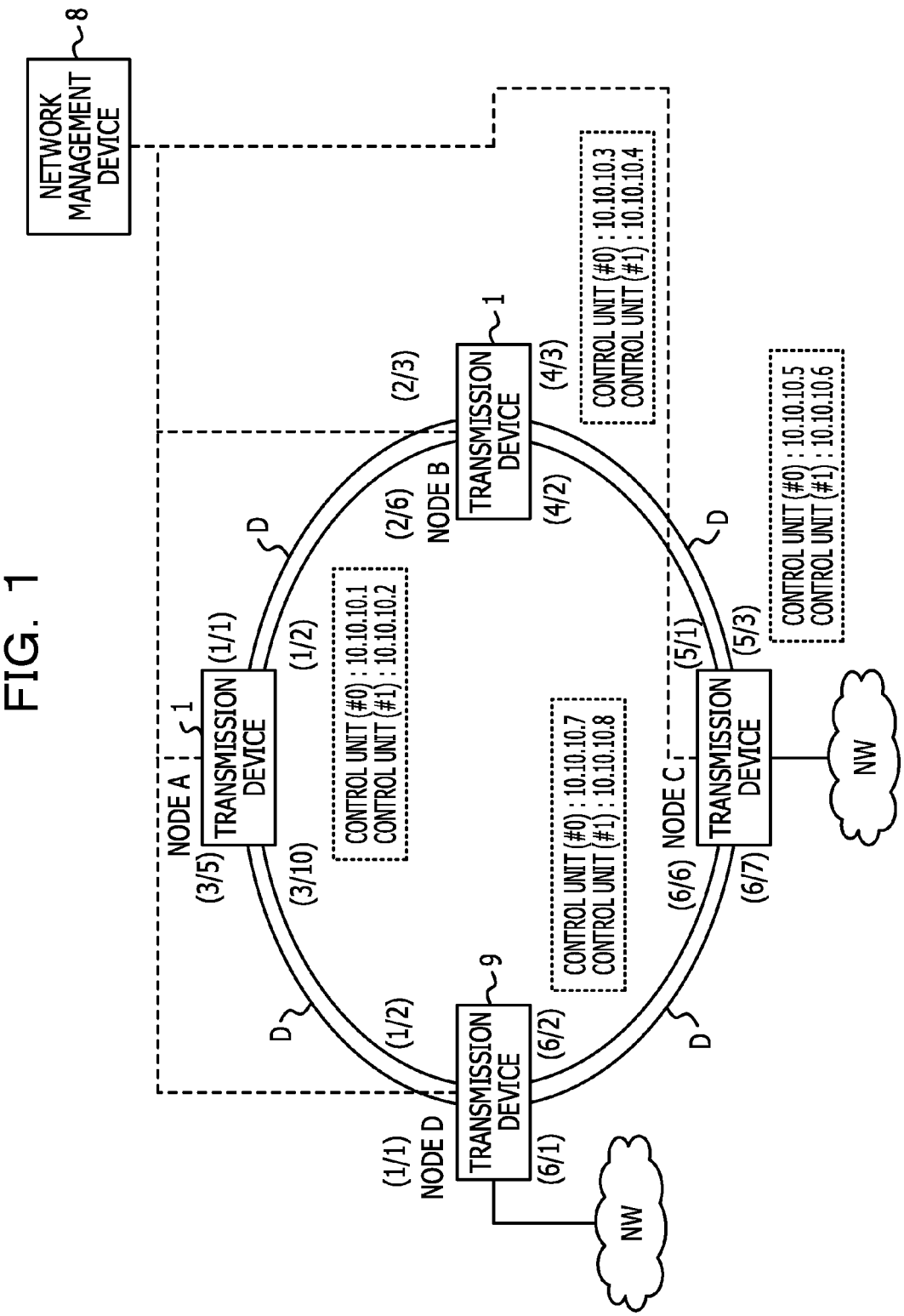
FIG. 1 is a configuration diagram illustrating a transmission system according to an embodiment.

FIG. 1 is a configuration diagram illustrating a transmission system according to an embodiment. As an example, the transmission system has a form of a ring network, and includes transmission devices 1 and 9 provided in nodes A to D connected to each other through a transmission path D (an optical fiber or the like).

The transmission devices 1 and 9 are, for example, Layer 2 switches, and each transfer a user frame serving as a main signal in accordance with a destination, between a plurality of communication lines. One of the transmission devices 1 and 9 transfers a user frame received from a user network (for example, an access network) NW, to another one of the transmission devices 1 and 9. In addition, while, in the present embodiment, as the user frame, an Ethernet frame (registered trademark, the same shall apply hereafter) is cited, the main signal is not limited to this, and an internet protocol (IP) packet or an asynchronous transfer mode (ATM) cell may be used as the main signal.

The transmission devices 1 and 9 each include a control unit (#0) of an operational system, which performs monitoring control of the entire corresponding transmission device, and a control unit (#1) of a backup system. In a case where a occurs in the control unit (#0) of the operational system, the control unit (#1) of the backup system performs the monitoring control on behalf of the control unit (#0) of the operational system. In other words, the control unit (#1) of the backup system is in a standby state when no failure occurs in the control unit (#0) of the operational system. In addition, in FIG. 1, the IP addresses of the respective control units (#0/#1) are described within each of frames of dotted lines, and a unit number and a port number, mutually connected, are described within each set of parentheses.

The individual control units (#0/#1) are connected to a network management device 8 that manages the individual transmission devices 1 and 9 within the network, through a communication line L for monitoring control, such as a LAN.

An administrator of the network manages the individual transmission devices 1 and 9 by operating the network management device 8. In order to identify a failure factor, the network management device 8 collects various kinds of logs from, for example, the control units (#0) in the respective transmission devices 1 and 9, and collects communication states (error rates or the like) of communication lines. Therefore, in a case where failures occur in both of the control units (#0/#1) within one of the transmission devices 1 and 9, the monitoring control of the corresponding transmission device is interrupted, and hence, a problem is caused in the operation of the network.

Therefore, in the present example, in a case where failures occur in both of the control units (#0/#1) in the transmission device (second transmission device) 1 in the node B (see "x" marks), the control unit (#1) of the backup system performs monitoring control of the transmission device 1 in the node B, in the transmission device (first transmission device) 1 in the node A. From this, interruption of the monitoring control of the transmission device 1 in the node B is avoided.

In addition, in subsequent description, an operation mode in which the control unit (#1) of the backup system performs monitoring control of the transmission device 1 in an adjacent node is expressed as a "control support mode". In addition, an operation mode in which the control unit (#1) of the backup system stands by for a failure in the control unit (#0) of the operational system is expressed as a "normal mode".

In the present example, in a case where failures occur in both of the control units (#0/#1) in the transmission device 1 in the node B, the control unit (#1) of the backup system in the transmission device 1 in the node A switches the operation mode from the normal mode to the control support mode. In addition, it is assumed that the transmission device 9 in the node D out of the transmission devices 1 and 9 within the network does not support the control support mode (in other words, it is difficult to perform monitoring control of the transmission device 1 in the adjacent node A or C).

(Configuration of Transmission Device)

Figure 2:
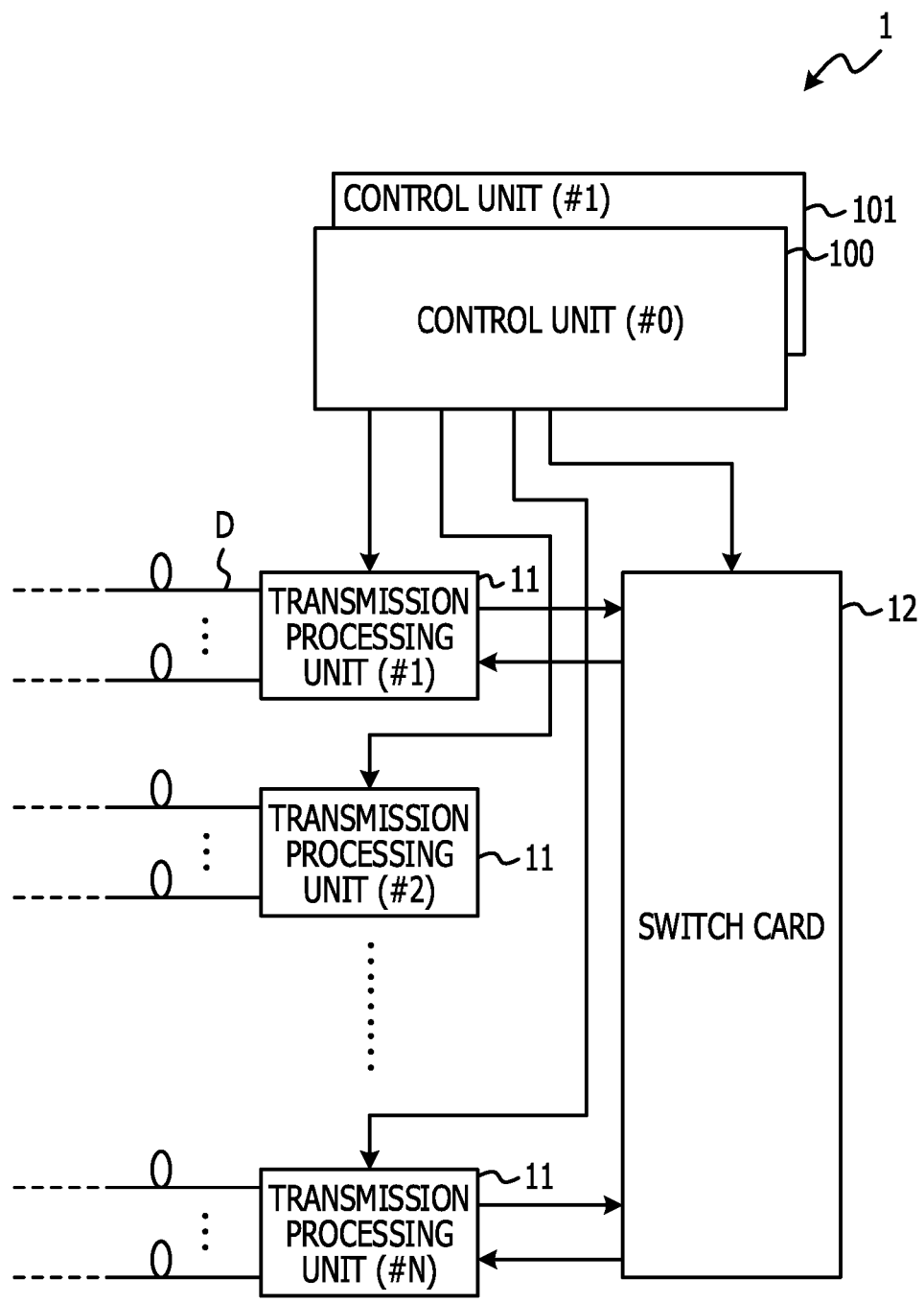
FIG. 2 is a configuration diagram illustrating a transmission device according to an embodiment.

FIG. 2 is a configuration diagram illustrating the transmission device 1 according to an embodiment. The transmission device 1 includes a plurality of transmission processing units (#1, #2, . . . , and #N) (transmission processing section) 11, a switch unit 12, the control unit (#0) 100 of the operational system (first or third control section) and the control unit 101 of the backup system (second or fourth control section) (#1).

The individual units 100, 101, 11, and 12 are contained in individual slots provided in the enclosure of the transmission device 1, and electrically connected to one another through a wiring substrate provided in a slot rear face. For example, the transmission processing unit (#1) 11 is contained in a slot #1 for a transmission processing unit, and the transmission processing unit (#2) 11 is contained in a slot #2 for a transmission processing unit. In addition, the individual transmission processing units 11 identify slot numbers of slots in which the units 11 themselves are implemented, using signal sources on the wiring substrate, which output identification signals corresponding to the slots #1 to #N (N: natural number).

Each of the transmission processing units 11 transmits and receives Ethernet frames (main signals) to and from another device such as the transmission device 1 or 9 in an adjacent node. A plurality of ports are implemented in each of the transmission processing units 11. Each of the transmission processing units 11 is connected to transmission paths (optical fibers or the like) D using the ports, and performs communication based on a standard of, for example, 10GBASE-LR.

The switch unit 12 exchanges Ethernet frames between the transmission processing units 11. More specifically, an Ethernet frame is input from one of the transmission processing units 11 to the switch unit 12, and the switch unit 12 outputs the Ethernet frame to one of the transmission processing units 11, which corresponds to the destination thereof.

As described above, the control unit (#0) 100 of the operational system and the control unit (#1) 101 of the backup system perform monitoring control of the entire transmission device 1. More specifically, by transmitting and receiving control signals to and from the individual transmission processing units 11 and the switch unit 12, the control unit (#0) 100 of the operational system performs monitoring control of the individual transmission processing units 11 and the switch unit 12. In a case where a failure occurs in the control unit (#0) 100 of the operational system, the control unit (#1) 101 of the backup system performs the monitoring control of the individual transmission processing units 11 and the switch unit 12, on behalf of the control unit (#0) 100 of the operational system.

In addition, in a case of being in the standby state when failures (hereinafter, expressed as a "monitoring control system failure") occur in both of the control units (#0/#1) 100 and 101 in the transmission device 1 in an adjacent node, the control unit (#1) 101 of the backup system switches the operation mode from the normal mode to the control support mode. In the control support mode, by transmitting and receiving, through the transmission processing section 11, control signals to and from the transmission processing units 11 in the transmission device 1 in the adjacent node, the control unit (#1) 101 of the backup system performs monitoring control of the corresponding transmission device 1.

In a case where a monitoring control system failure occurs in the transmission device 1 in the node B, a control communication transmission processing unit 11 (second transmission processing section) is determined from among the transmission processing units 11. The control communication transmission processing unit 11 transmits and receives main signals and control signals to and from the transmission device 1 in the adjacent node A. The other transmission processing units 11 other than the control communication transmission processing unit transmit and receive control signals to and from the transmission device 1 in the adjacent node A through the control communication transmission processing unit 11.

In addition, in the transmission device 1 in the node A, the control unit (#1) 101 of the backup system switches the operation mode from the normal mode to the control support mode. The control unit (#1) 101 of the backup system transmits and receives control signals to and from the control communication transmission processing unit 11 through one of the transmission processing units 11 (first transmission processing section) that transmits and receives main signals to and from the control communication transmission processing unit 11 in the node B. From this, the control unit (#1) 101 of the backup system in the node A performs monitoring control of the transmission processing units 11 in the node B. In addition, the monitoring control of the transmission processing units 11 is performed in accordance with an instruction of the network management device 8.

In this way, the control communication transmission processing unit 11 in the node B and the control unit (#1) 101 of the backup system in the node A perform communication with each other, and thus, the monitoring control of the transmission device 1 in the node B in which a monitoring control system failure occur is continued. In addition, as described later, the control signals used for the monitoring control of the transmission device 1 in the node B are transmitted and received through a virtual interface formed between the control communication transmission processing unit 11 in the node B and one of the transmission processing units 11 in the node A.

(Configuration of Transmission Processing Unit)

Figure 3:
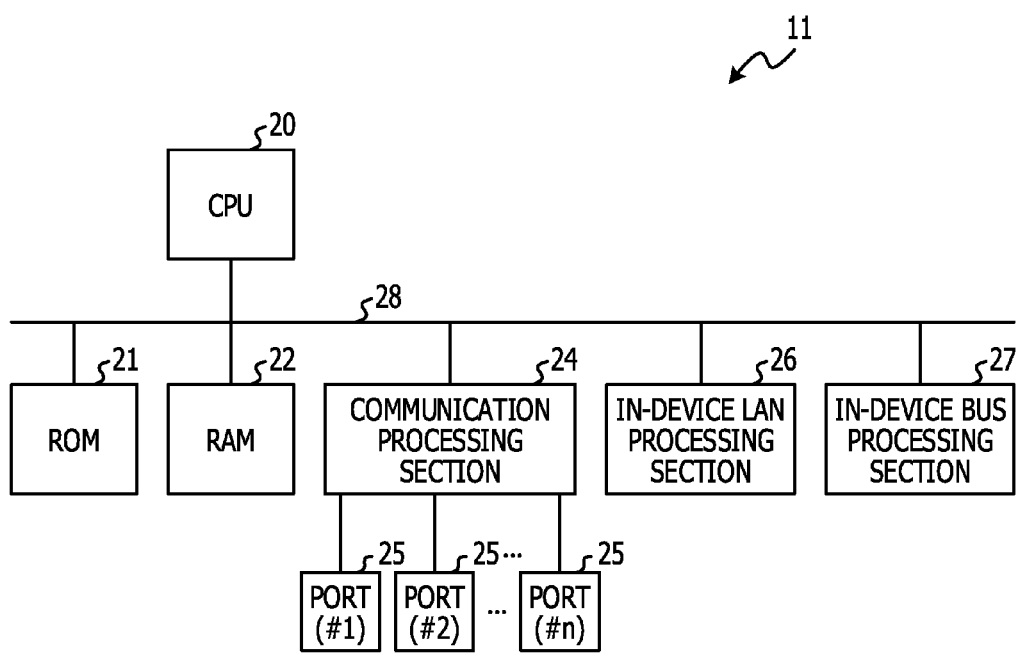
FIG. 3 is a configuration diagram illustrating an example of a configuration of a transmission processing unit.

FIG. 3 is a configuration diagram illustrating an example of the configuration of each of the transmission processing units 11. The transmission processing unit 11 includes a CPU 20, a ROM 21, a RAM 22, a communication processing section 24, ports (#1 to #n) 25, an in-device LAN processing section 26, an in-device bus processing section 27, and so forth.

The CPU 20 is an arithmetic processing unit, and executes various kinds of processing operations in accordance with a program. The CPU 20 is connected to the individual units 21, 22, and 25 to 27 through a bus 28. The RAM 22 is used as a working memory for the CPU 20. In addition, the ROM 21 is used as a storage unit that stores therein an operation system (OS) and a program, used for causing the CPU 20 to operate, various kinds of information, and so forth.

The communication processing section 24 is a communication unit that has, for example, respective functions for a PHY layer and a MAC layer and performs communication with the transmission device 1 in an adjacent node. The communication processing section 24 transmits and receives main signals and control signals to and from the transmission device 1 in an adjacent node, through one of the ports (#1 to #n) 25.

The in-device LAN processing section 26 processes communication routed through a LAN configured between the control units (#0/#1) 100 and 101, the transmission processing units (#1 to #N) 11, and the switch unit 12. The CPU 20 transmits and receives inter-unit communication frames, described later, to and from the control units (#0/#1) 100 and 101 and the other transmission processing units 11, through the in-device LAN processing section 26.

The in-device bus processing section 27 processes communication routed through a bus configured between the control units (#0/#1) 100 and 101, the transmission processing units (#1 to #N) 11, and the switch unit 12. The CPU 20 transmits and receives implementation information and so forth to and from the other units 100, 101, 11, and 12 through the in-device bus processing section 27.

(Configuration of Switch Unit)

Figure 4:
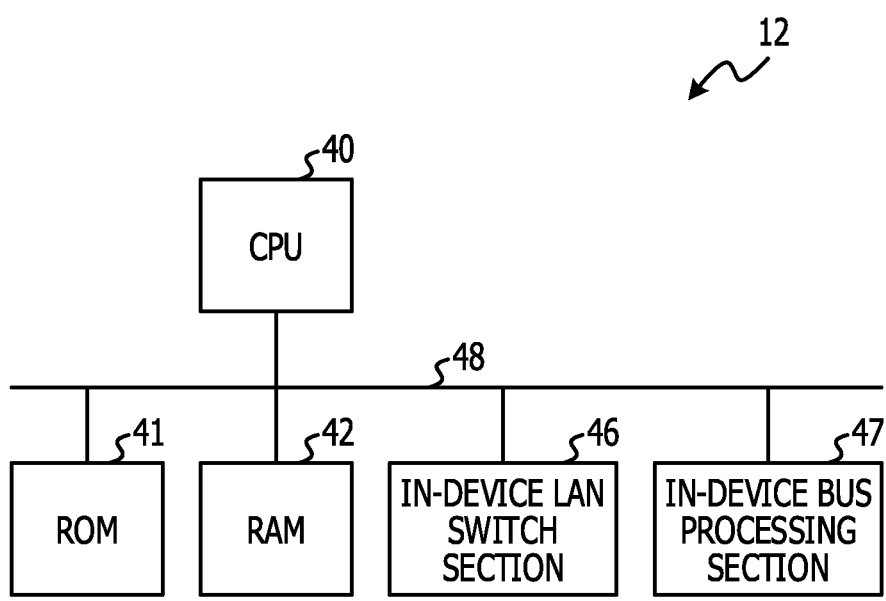
FIG. 4 is a configuration diagram illustrating an example of a configuration of a switch unit.

FIG. 4 is a configuration diagram illustrating an example of the configuration of the switch unit 12. The switch unit 12 includes a CPU 40, a ROM 41, a RAM 42, an in-device LAN switch section 46, an in-device bus processing section 47, and so forth.

The CPU 40 is an arithmetic processing unit, and executes various kinds of processing operations in accordance with a program. The CPU 40 is connected to the individual units 41, 42, 46, and 47 through a bus 48. The RAM 42 is used as a working memory for the CPU 40. In addition, the ROM 41 is used as a storage unit that stores therein an OS and a program, used for causing the CPU 40 to operate, various kinds of information, and so forth.

The in-device LAN switch section 46 exchanges inter-unit communication frames, in the LAN configured between the control units (#0/#1) 100 and 101, the transmission processing units (#1 to #N) 11, and the switch unit 12. The CPU 40 transmits and receives the inter-unit communication frames to and from the control units (#0/#1) 100 and 101 and the other transmission processing units 11, through the in-device LAN switch section 46.

The in-device bus processing section 47 processes communication routed through a bus configured between the control units (#0/#1) 100 and 101, the transmission processing units (#1 to #N) 11, and the switch unit 12. The CPU 40 transmits and receives implementation information and so forth to and from the other units 100, 101, and 11 through the in-device bus processing section 47.

(Configuration of Control Unit)

Figure 5:
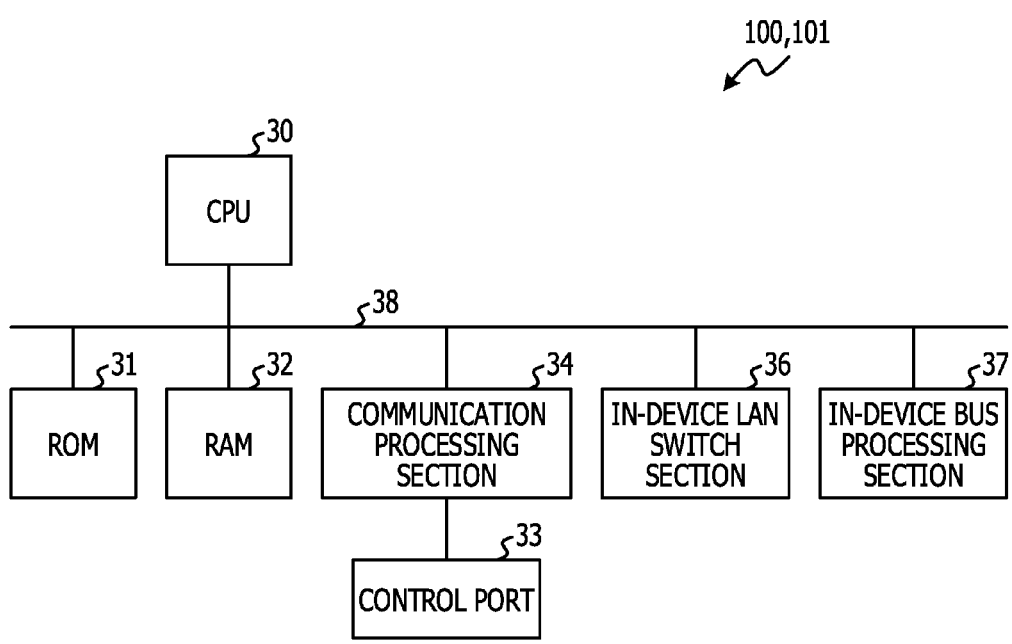
FIG. 5 is a configuration diagram illustrating an example of a configuration of a control unit.

FIG. 5 is a configuration diagram illustrating an example of the configuration of each of the control units (#0/#1) 100 and 101. The control units (#0/#1) 100 and 101 each include a CPU 30, a ROM 31, a RAM 32, a communication processing section 34, an in-device LAN switch section 36, an in-device bus control section 37, and so forth.

The CPU 30 is an arithmetic processing unit, and executes various kinds of processing operations in accordance with a program. The CPU 30 is connected to the individual units 31 to 34, 36, and 37 through a bus 38. The RAM 32 is used as a working memory for the CPU 30. In addition, the ROM 31 is used as a storage unit that stores therein an OS and a program, used for causing the CPU 30 to operate, and various kinds of information.

The communication processing section 34 is a communication unit that has, for example, respective functions for a PHY layer and a MAC layer and performs communication with the network management device 8. The communication processing section 34 performs communication with the network management device 8 through a control port 33. From this, the CPU 30 receives a command from the network management device 8, and transmit a response to the network management device 8.

The CPU 30 performs monitoring control of the transmission processing units 11 and the switch unit 12 in accordance with a command of the network management device 8, and transmits a response to the network management device 8, as an execution result of the corresponding monitoring control. In a case of the control unit (#1) 101 of the backup system, when failures occur in the control units (#0/#1) 100 and 101 in the transmission device 1 in an adjacent node, the CPU 30 switches the operation mode from the normal mode to the control support mode. At this time, the CPU 30 performs monitoring control of the transmission processing units 11 in the transmission device 1 in the adjacent node in accordance with the command of the network management device 8, and transmits the response to the network management device 8, as an execution result of the corresponding monitoring control.

(In-Device LAN and In-Device Bus)

Figure 6:
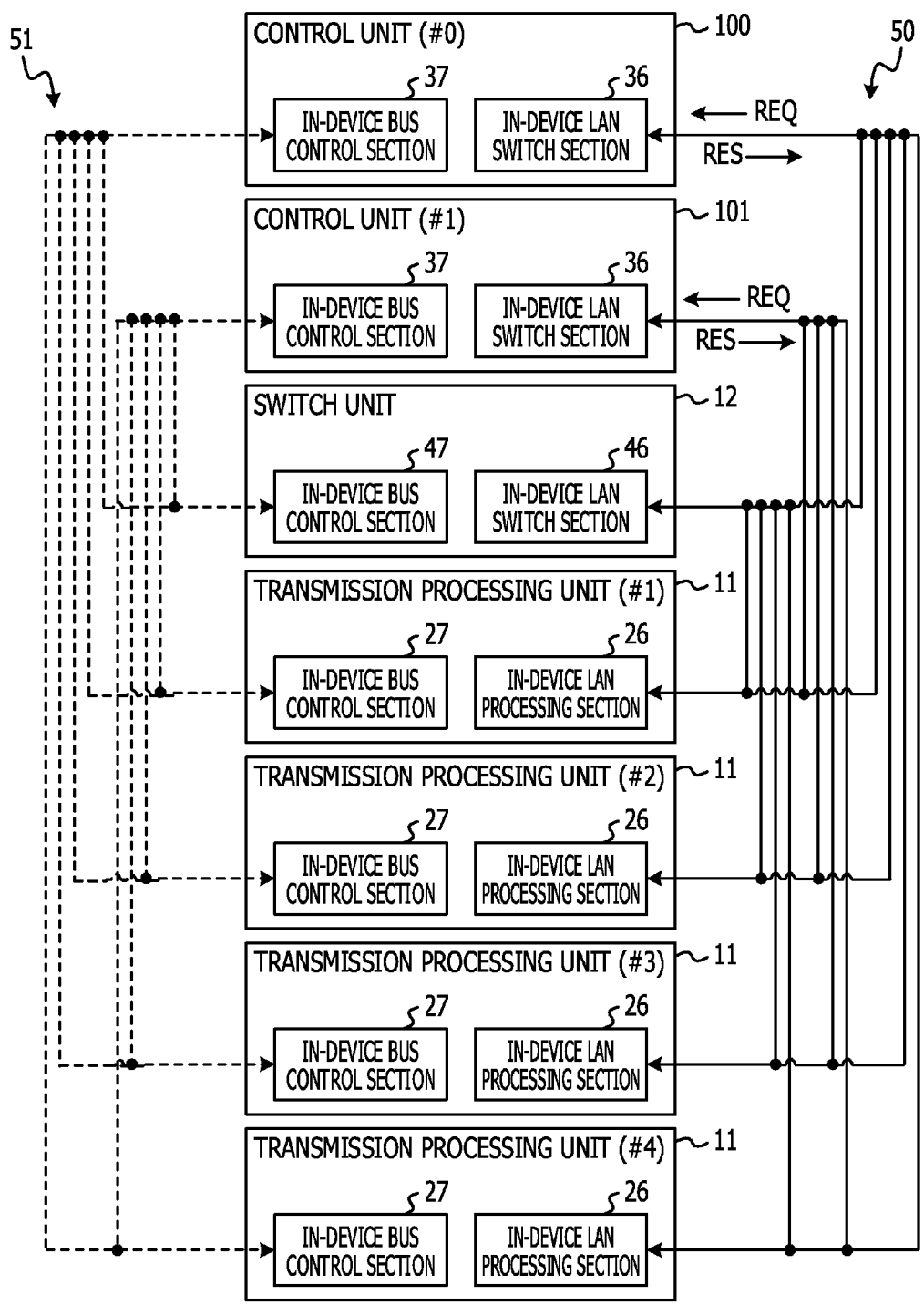
FIG. 6 is a configuration diagram illustrating an example of a configuration of a communication unit between units.

FIG. 6 is a configuration diagram illustrating an example of the configuration of a communication unit between the units 11, 12, 100, and 101. In the present embodiment, as the communication unit between the units 11, 12, 100, and 101, an in-device LAN 50 and an in-device bus 51 are cited. The in-device LAN 50 and the in-device bus 51 are formed in, for example, a wiring substrate provided in the rear face of the enclosure of the transmission device 1.

The control units (#0/#1) 100 and 101 are each connected to the in-device LAN 50 through a corresponding in-device LAN switch section 36, and the transmission processing units 11 are each connected to the in-device LAN 50 through the corresponding in-device LAN processing section 26. In addition, the switch unit 12 is connected to the in-device LAN 50 through the in-device LAN switch section 46.

By transmitting and receiving inter-unit frames to and from one another through the in-device LAN 50, the individual units 11, 12, 100, and 101 perform communication with one another. Based on, for example, communication routed through the in-device LAN 50, one of the transmission processing units 11 detects a failure in the control unit 100 or 101. In this case, through the in-device LAN 50, the corresponding transmission processing unit 11 transmits state confirmation request messages REQ to the control units 100 and 101 at predetermined time intervals.

Upon receiving the state confirmation request message REQ, the control units 100 and 101 each transmit a response message RES to the corresponding transmission processing unit 11. In a case where no response message is received within, for example, a predetermined time period after transmitting of the state confirmation request message REQ, the corresponding transmission processing unit 11 detects a failure in the control unit 100 or 101. In addition, even in a case of receiving the response message, when information indicating occurrence of a failure is included in the corresponding response message, the corresponding transmission processing unit 11 detects a failure in the control unit 100 or 101.

The control units 100 and 101 are connected to the in-device bus 51 through the respective in-device bus control sections 37, and the transmission processing units 11 are connected to the in-device bus 51 through the respective in-device bus processing sections 27. In addition, the switch unit 12 is connected to the in-device bus 51 through the in-device bus processing section 47.

The in-device bus 51 is a unit that includes a plurality of signal lines, and gives notice of information using a voltage level (a high level or a low level) of each signal line. Therefore, the in-device bus 51 is used for giving notice of urgent information such as the implementation states of the individual units 11, 12, 100, and 101. The individual transmission processing units 11 each monitor, for example, the implementation states of the control units (#0/#1) 100 and 101 and the presence or absence of a failure therein through the in-device bus 51 at predetermined time intervals. In addition, the implementation states of the control units (#0/#1) 100 and 101 may be monitored through the in-device LAN 50.

In this way, the individual units 11, 12, 100, and 101 monitor the implementation states of other units and the presence or absence of failures therein through the in-device LAN 50 or the in-device bus 51 and write, as implementation information and failure information, the implementation states of other units and the presence or absence of failures in, for example, the ROMs 21, 41, and 31.

FIG. 7 illustrates examples of the implementation information and the failure information of each of the units 11, 12, 100, and 101. In FIG. 7, "UNIT" indicates the type of a unit, and "SLOT" indicates the number of a slot in which the corresponding unit is implemented. "IMPLEMENTATION INFORMATION" indicates that the corresponding unit is implemented, in a case of being "1", and indicates that the corresponding unit is not implemented, in a case of being "0". "FAILURE INFORMATION" indicates that a failure occurs in the corresponding unit, in a case of being "1", and indicates that no failure occurs in the corresponding unit, in a case of being "0".

In a case where the pieces of failure information of both the control units (#0/#1) 100 and 101 indicate "1", the transmission processing units 11 each perform communication with the control unit (#1) 101 of the backup system in an adjacent node, through the virtual interface generated by the CPU 20 in the control communication transmission processing unit 11.

(Functional Configurations of Control Units and Transmission Processing Unit)

Figure 8:
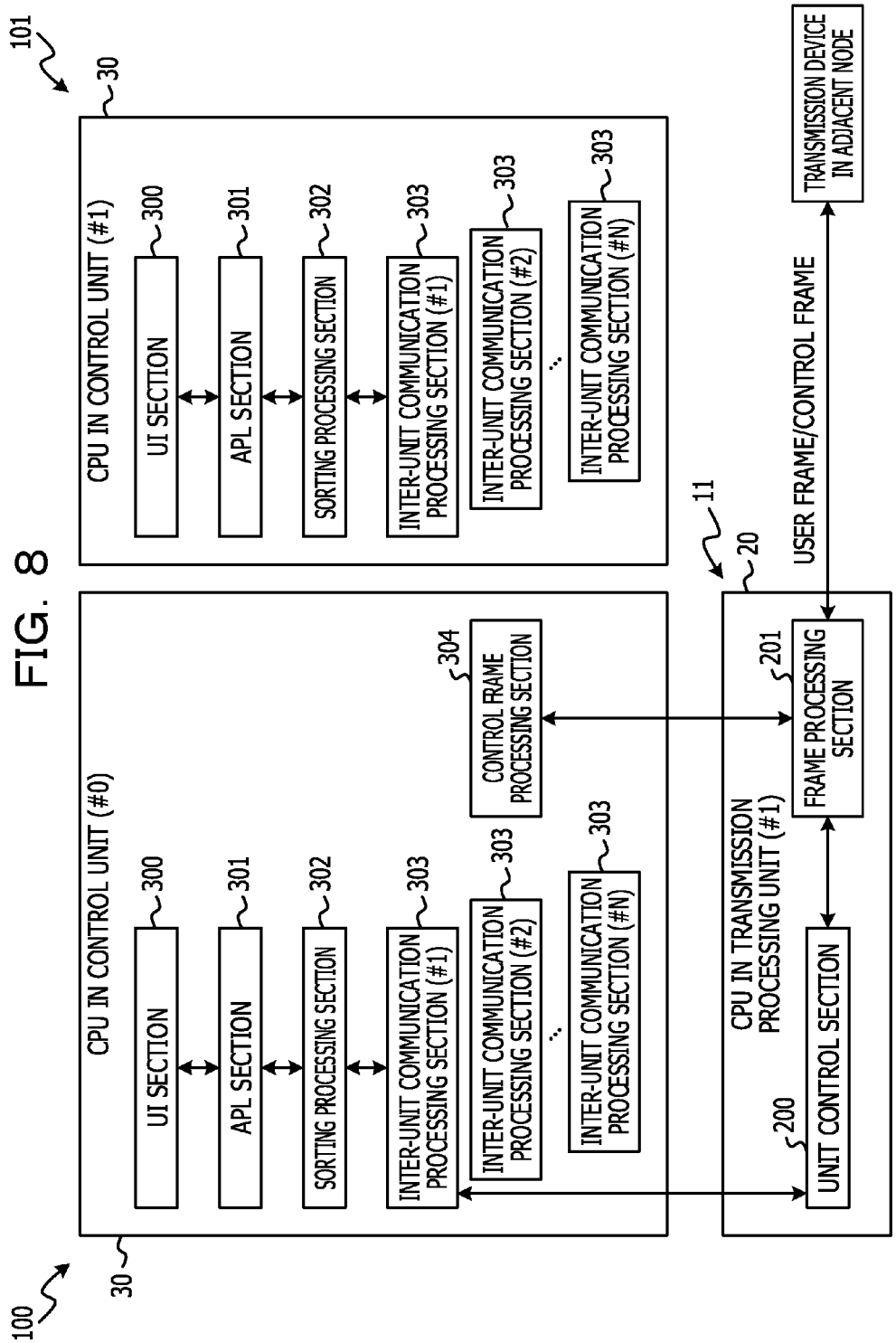
FIG. 8 is a configuration diagram illustrating examples of functional configurations of control units and a transmission processing unit.

FIG. 8 is a configuration diagram illustrating examples of the functional configurations of the control units 100 and 101 and one of the transmission processing units 11. If the CPUs 30 in the control units 100 and 101 and the CPU 20 in the transmission processing unit 11 read respective programs from the ROMs 31 and 21, a plurality of functions are formed.

The CPUs 30 in the control units (#0/#1) 100 and 101 each includes a user interface (UI) section 300, an application (APL) section 301, a sorting processing section 302, and a plurality of inter-unit communication processing sections (#1 to #N) 303. The CPU 30 in the control unit (#0) 100 of the operational system further includes a control frame processing section 304. The CPU 20 in the transmission processing unit 11 includes a unit control section 200, and a frame processing section 201.

The UI section 300 receives a command of the network management device 8 from the communication processing section 34, and analyzes the content of the command. The UI section 300 outputs, to the APL section 301, information obtained by the analysis of the command.

The APL section 301 generates a command message (control signal), based on the information input from the UI section 300, and outputs the command message to the sorting processing section 302. The sorting processing section 302 analyzes the destination of the command message, and sorts the command message into the inter-unit communication processing section 303 corresponding to one of the transmission processing units 11 serving as the destination. The sorting processing section 302 outputs, for example, a command message whose destination is the transmission processing unit (#1) 11, to the inter-unit communication processing section (#1) 303, and outputs, for example, a command message whose destination is the transmission processing unit (#2) 11, to the inter-unit communication processing section (#2) 303.

The inter-unit communication processing sections (#1 to #N) 303 transmit command messages to the unit control sections 200 in the transmission processing units (#1 to #N) 11, respectively. In addition, in FIG. 8, only the unit control section 200 in the transmission processing unit (#1) 11 out of the transmission processing units (#1 to #N) 11 is illustrated.

The unit control section 200 performs processing corresponding to the content of the received command message, and generates and outputs, as an execution result of the corresponding processing, a response message (control signal) to the corresponding inter-unit communication processing section 303. In a case of receiving, for example, a command message requesting collection of the information of a communication state, the unit control section 200 acquires, from the communication processing section 24, pieces of information such as an error rate and the number of frame losses. In addition, the unit control section 200 causes the collected information of a communication state to be contained in the response message, and output the response message to the corresponding inter-unit communication processing section 303.

The response message output from the unit control section 200 is transmitted to the network management device 8 through the communication processing section 34 after being routed through the corresponding inter-unit communication processing section 303, the sorting processing section 302, the APL section 301, and the UI section 300 in this order. In addition, the command message and the response message are transmitted and received between the control units (#0/#1) 100 and 101 and the transmission processing unit 11 through the in-device LAN 50.

In this way, in accordance with an instruction of the network management device 8, the control units (#0/#1) 100 and 101 transmit and receive the command message and the response message to and from each of the transmission processing units 11, and thus, perform monitoring control of the individual transmission processing units 11. The command message and the response message are transmitted and received between the units 100, 101, and 11 in states of being contained in the inter-unit communication frames.

Figure 9A:
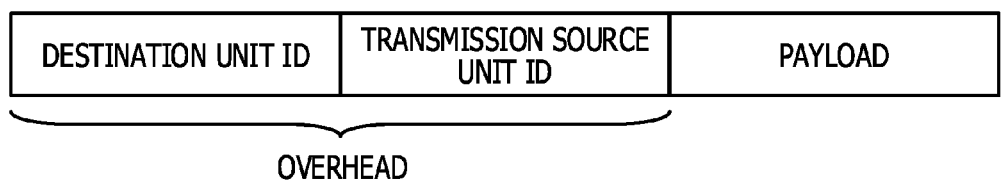
FIGS. 9A and 9B are configuration diagrams illustrating configurations of an inter-unit communication frame and an Ethernet frame, respectively.

FIG. 9A is a configuration diagram illustrating the configuration of an inter-unit communication frame. The inter-unit communication frame includes an overhead area and a payload area.

The overhead area includes an identifier (destination unit ID) indicating a unit of a destination, and an identifier (transmission source unit ID) indicating a unit of a transmission source. In addition, the payload area contains a command message or a response message (control signal or first and second control signals). In addition, the overhead area may include pieces of information such as a signal number indicating the type of the command message or the response message, a node identifier, a process name, a frame length, a payload length, and a timer identifier (only in a case of using a timer).

With reference to FIG. 8 again, through the communication processing section 24, the frame processing section 201 transmits and receives, to and from the transmission device 1 in an adjacent node, a user frame serving as a main signal, and a control frame. The frame processing section 201 transfers the received user frame to the switch unit 12, and transfers the received control frame to the control unit (#0) 100 of the operational system or the unit control section 200.

The control frame includes, for example, information indicating the occurrence of a monitoring control system failure in the transmission device 1 in an adjacent node. Information within the control frame is contained in the inter-unit communication frame, and transferred to the control unit (#0) 100.

In the control unit (#0) 100 of the operational system, the control frame processing section 304 receives and processes the control frame. In a case of receiving the control frame including the information indicating the occurrence of a monitoring control system failure in an adjacent node, the control frame processing section 304 switches the operation mode of the control unit (#1) 101 of the backup system from the normal mode to the control support mode. The user frame and the control frame each have the format of an Ethernet frame.

Figure 9B:
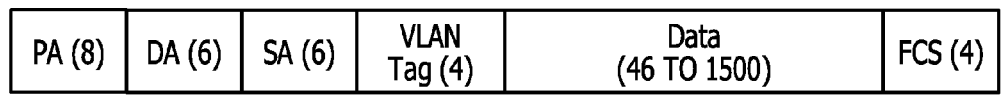

FIG. 9B is a configuration diagram illustrating the configuration of the Ethernet frame. The Ethernet frame includes a preamble area (PA), a destination MAC address (DA), a transmission source MAC address (SA), a virtual LAN (VLAN) Tag, a data area, and a frame check sequence (FCS). In addition, a numeric character or numeric characters within each set of parentheses indicate the number of bytes of a corresponding area.

The PA area is used for frame synchronization. In addition, the VLAN Tag includes an Ether type and a VLAN ID. In a case of the control frame, the data area includes information indicating the occurrence of a failure such as a monitoring control system failure. The FCS is a code used for checking a data error in the Ethernet frame.

One of the transmission processing unit 11 performs communication with the control units (#0/#1) 100 and 101 and the other transmission processing units 11, using the inter-unit communication frames, and performs communication with transmission processing units 11 in the transmission device 1 in an adjacent node, using the Ethernet frames.

Figure 10:
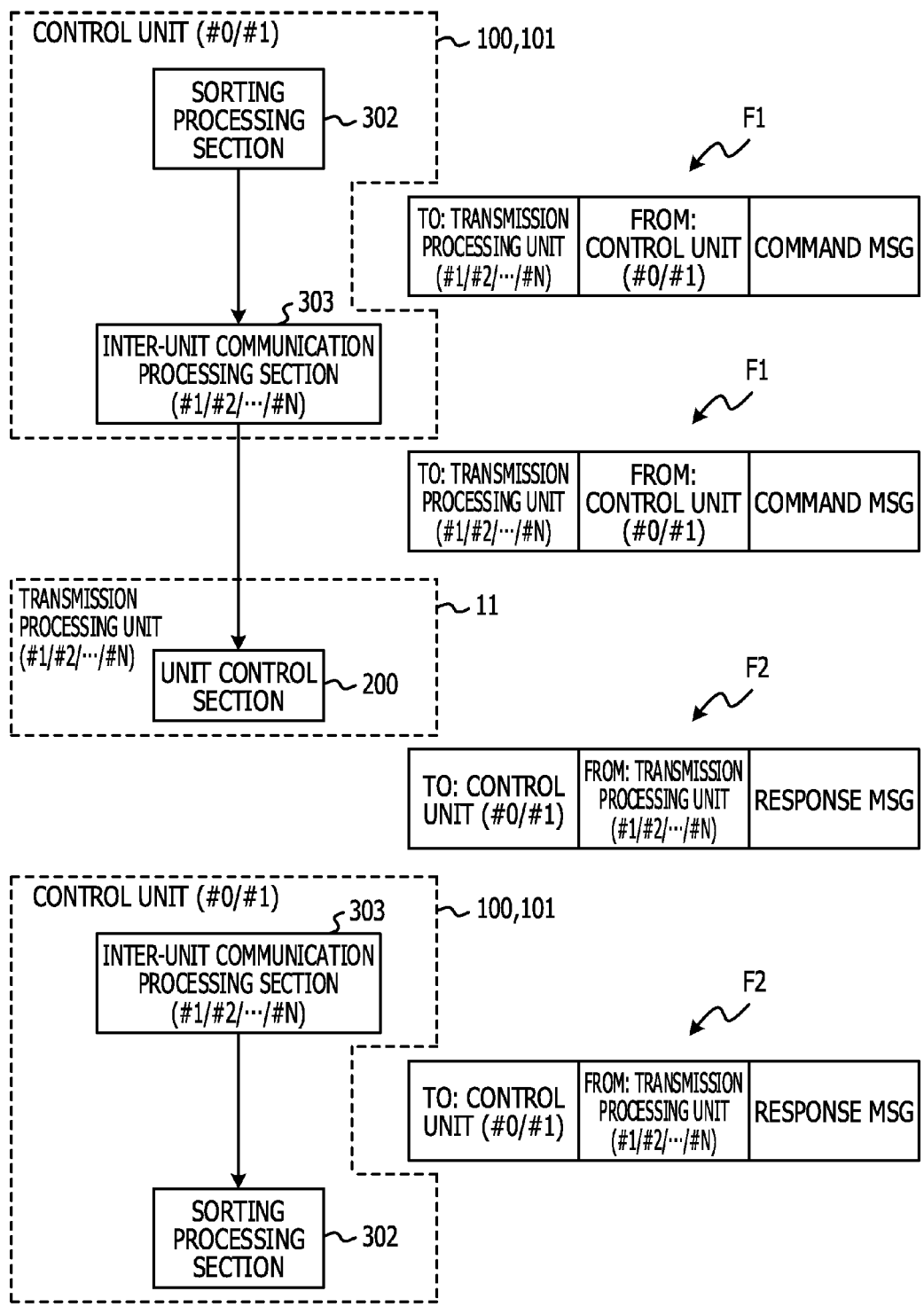
FIG. 10 is a diagram illustrating an example of communication between units.

FIG. 10 illustrates an example of communication between units. FIG. 10 illustrates the flow of transmission and reception of inter-unit communication frames between the sorting processing section 302 and the unit control section 200.

The sorting processing section 302 transmits an inter-unit communication frame F1 containing a command message, to one of the inter-unit communication processing sections (#1/#2/ . . . /#N) 303, which corresponds to the destination of the command message.

In the inter-unit communication frame F1, the destination unit ID (see "TO:") indicates the ID of one of the transmission processing units (#1/#2/ . . . /#N) 11, and the transmission source unit ID (see "FROM:") indicates the ID of one of the control units (#0/#1) 100 and 101. The payload area of the inter-unit communication frame F1 contains a command message (command MSG).

The corresponding one of the inter-unit communication processing sections (#1/#2/ . . . /#N) 303 outputs the received inter-unit communication frame F1 to the unit control section 200 in the corresponding one of the transmission processing unit (#1/#2/ . . . /#N) 11. The unit control section 200 performs processing corresponding to the command message. As this processing, for example, the acquisition of communication state information or failure information may be cited. The unit control section 200 generates, as an execution result of the command, a response message (response MSG), causes the response message to be contained in an inter-unit communication frame F2, and outputs the response message to the corresponding one of the inter-unit communication processing sections (#1/#2/ . . . /#N) 303.

In the inter-unit communication frame F2, the destination unit ID (see "TO:") indicates the ID of one of the control units (#0/#1) 100 and 101, and the transmission source unit ID (see "FROM:") indicates the ID of one of the transmission processing units (#1/#2/ . . . /#N) 11. The payload area of the inter-unit communication frame F2 contains the response message.

The corresponding one of the inter-unit communication processing sections (#1/#2/ . . . /#N) 303 outputs the inter-unit communication frame F2 to the sorting processing section 302. In this way, communication between units is performed.

In this way, in accordance with an instruction of the network management device 8, the control units (#0/#1) 100 and 101 transmit and receive the control signals to and from each of the transmission processing sections 11, and thus, perform monitoring control of the individual transmission processing sections 11.

(Acquisition Processing for Address Information)

In advance of the monitoring control based on the control support mode, using the control frames, each of the transmission processing units 11 acquires pieces of address information from other transmission devices 1 serving as connection destinations of the respective ports (#1, #2, . . . , and #n) 25. The pieces of address information each include the IP address of the control unit (#0) 100 of the operational system in the transmission device 1 serving as a connection destination, and the MAC addresses of facing ports 25 of the corresponding transmission device 1, and are stored in the ROM 21.

In FIGS. 11A to 11C, address tables held by the transmission devices 1 in the respective nodes A to C are illustrated. FIGS. 11A to 11C illustrate address tables held by the transmission devices 1 in the nodes A to C, respectively. The address tables each include address information for each port 25. The pieces of address information each include an "IP address" and a "MAC address".

In FIGS. 11A to 11C, "SLOT NUMBER/PORT NUMBER" indicates the number of a slot in which one of the transmission processing units 11 is contained, and the number of a port within the corresponding transmission processing unit 11. For example, "1/1" indicates the port (#1) 25 of the transmission processing unit (#1) 11, and "4/2" indicates the port (#2) 25 of the transmission processing unit (#4) 11.

Numeric characters within each set of parentheses in FIG. 1 correspond to this "SLOT NUMBER/PORT NUMBER". For example, the port (#2) 25 of the transmission processing unit (#4) in the transmission device 1 in the node B is connected to the port (#1) 25 of the transmission processing unit (#5) in the transmission device 1 in the node C. In addition, the port (#3) 25 of the transmission processing unit (#2) in the transmission device 1 in the node B is connected to the port (#1) 25 of the transmission processing unit (#1) in the transmission device 1 in the node A.

"IP ADDRESS" indicates the IP address of the control unit (#0) 100 of the operational system in the transmission device 1 serving as the connection destination of the corresponding port 25. For example, since the port (#2) 25 of the transmission processing unit (#4) in the transmission device 1 in the node B is connected to the transmission device 1 in the node C, the IP address is "10.10.10.5". In addition, the port (#3) 25 of the transmission processing unit (#2) in the transmission device 1 in the node C is connected to the transmission device 1 in the node A, the IP address is "10.10.10.1".

"MAC ADDRESS" indicates the MAC address of the port 25 facing the corresponding port 25. In addition, as for the transmission device 9 that does not support the control support mode, the "IP ADDRESS" and the "MAC ADDRESS" each indicate that all the digits thereof are "0".

Figure 12:
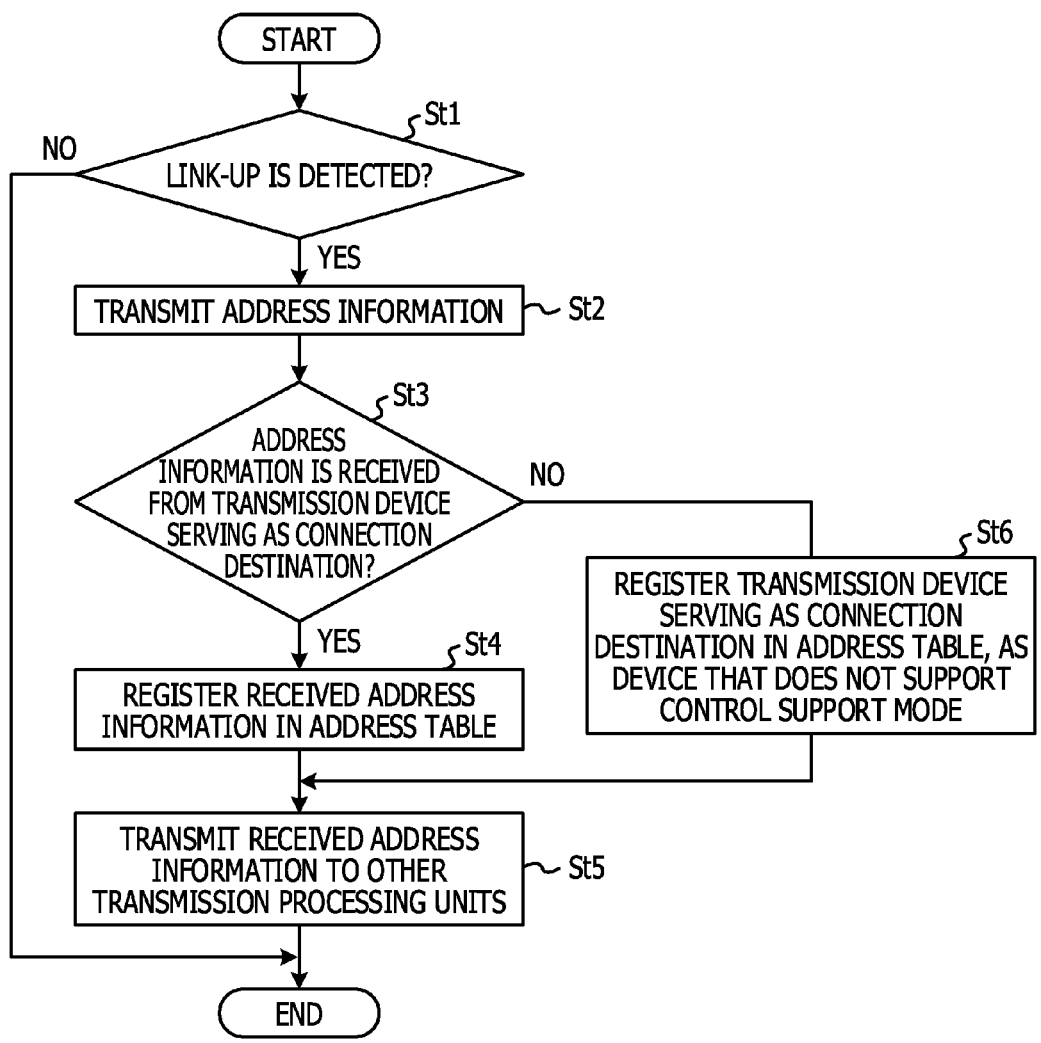
FIG. 12 is a flowchart illustrating an example of acquisition processing for address information.

FIG. 12 is a flowchart illustrating an example of acquisition processing for address information. This processing is performed in the transmission processing unit 11 at, for example, predetermined time intervals.

Upon detecting the link-up of one of the ports 25, in other words, detecting that communication with one of the transmission devices 1 and 9 serving as a connection destination is established (step St1: Yes), the unit control section 200 transmits the address information of the corresponding port 25 to the corresponding one of the transmission devices 1 and 9 serving as a connection destination (step St2). In a case where no link-up is detected (step St1: No), the unit control section 200 terminates the processing.

Next, the unit control section 200 determines whether or not address information is received from one of the transmission devices 1 serving as a connection destination (step St3). In this determination processing, the presence or absence of reception of the address information within, for example, a given time period is determined.

In a case where no address information is received (step St3: No), the unit control section 200 registers the corresponding transmission device 1 serving as a connection destination, in the address table, as a device that does not support the control support mode (in other words, the transmission device 9 in the node D) (step St6). In other words, the "IP address" and the "MAC address" of the corresponding port 25 each indicate that all the digits thereof are "0".

In addition, in a case where the address information is received (step St3: Yes), the unit control section 200 registers the received address information of the corresponding transmission device 1 serving as a connection destination, in the address table (step St4).

Next, the unit control section 200 causes the received address information to be contained in the inter-unit communication frame, and transmits the received address information to the other transmission processing units 11 through the in-device LAN 50 (step St5). In each of the other transmission processing units 11, the unit control section 200 updates the address table within the unit itself, based on the received address information. From this, all the transmission processing units 11 within the transmission device 1 hold common address tables.

In this way, the acquisition processing for the address information is performed. The "IP address" of the address information is used as an IP address in the control support mode of the control unit (#1) 101. In addition, the "MAC address" of the address information is used as the DA of an Ethernet frame for monitoring control, in communication routed through the virtual interface.

(Virtual Interface)

In a case where a monitoring control system failure occurs, a virtual interface is formed between one of the transmission processing units 11 within the transmission device 1 in which the corresponding failure occurs and one of the transmission processing units 11 in a connection destination (adjacent node) of the corresponding transmission processing unit 11. The transmission processing units 11 each transmit and receive, through the virtual interface, monitoring control Ethernet frames (control signals) used for performing monitoring control of the transmission device 1 in which a failure occurs.

The configuration of the monitoring control Ethernet frame is the same as the Ethernet frame illustrated in FIG. 9B, and the inter-unit communication frame including the command message and the response message is contained in the data area. In addition, as described above, the "MAC address" of the corresponding port 25 registered in the address table is inserted into the DA.

The CPUs 20 in the respective transmission processing units 11 each generate and start a virtual interface frame processing section 203 (see FIG. 16 and FIG. 17) that performs transmission and reception processing dedicated to the virtual interface, and hence, the virtual interface is formed. As described below, the virtual interface frame processing section 203 transfers the monitoring control Ethernet frames to and from other transmission processing units 11 or the control unit (#1) 101 of the backup system. Through the following process, the virtual interface frame processing section 203 is formed in the control communication transmission processing unit selected from among the plural transmission processing units 11.

Figure 13:
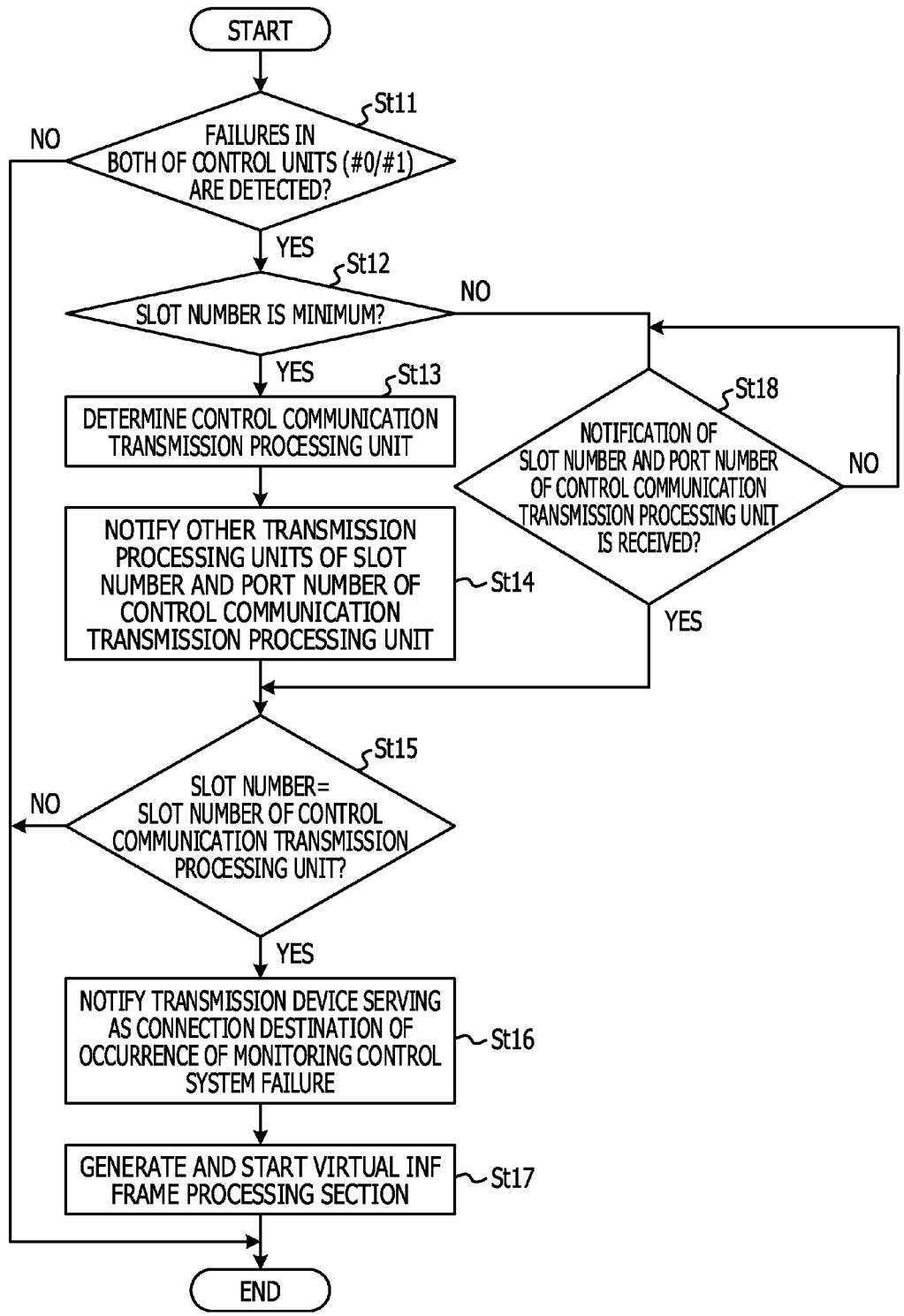
FIG. 13 is a flowchart illustrating an example of processing in a transmission processing unit in a transmission device in which failures occur in both of control units.

FIG. 13 is a flowchart illustrating an example of processing in the transmission processing unit 11 in the transmission device 1 (corresponding to the transmission device in the node B in the example of FIG. 1) in which failures occur in both of the control units 100 and 101. This processing is performed in one of the transmission processing units 11 at, for example, predetermined time intervals.

Based on the failure information (see FIG. 7), the unit control section 200 determines the presence or absence of detection of failures (a monitoring control system failure) in both of the control units (#0/#1) 100 and 101 (step St11). In a case where no monitoring control system failure is detected (step St11: No), the unit control section 200 terminates the processing.

In a case where the monitoring control system failure is detected (step St11: Yes), the unit control section 200 determines whether or not the slot number of the corresponding transmission processing unit 11 is a minimum among the slot numbers (#1 to #N) of all the transmission processing units 11 (step St12). In a case where, for example, the transmission processing units (#1/#2/#5) 11 are implemented in the slots #1, #2, and #5, respectively, the slot number of the transmission processing unit (#1) 11 is a minimum. Therefore, the determination result in the step St12 is "Yes" in the determination of the transmission processing unit (#1) 11, and on the other hand, the determination result in the step St12 is "No" in the determination of the transmission processing units (#2/#5) 11.

In a case where the slot number is a minimum (step St12: Yes), the unit control section 200 determines the control communication transmission processing unit 11 from among all the transmission processing units 11 (step St13). The control communication transmission processing unit 11 transmits and receives the monitoring control Ethernet frames to and from the transmission device 1 in an adjacent node, through the virtual interface (the virtual interface frame processing section 203). In the present processing, the slot number of the control communication transmission processing unit 11, and one of the port numbers (#1 to #n) of the ports 25, with which the corresponding communication is performed, are determined. In addition, determination processing for the control communication transmission processing unit will be described later.

Next, through the in-device LAN 50, the unit control section 200 notifies the other transmission processing units 11 of the slot number and the port number of the control communication transmission processing unit (step St14). At this time, the slot number and the port number are contained in the payload of the inter-unit communication frame.

In addition, in a case where the slot number is not a minimum (step St12: No), the unit control section 200 determines the presence or absence of reception of the slot number and the port number of the control communication transmission processing unit (step St18). In a case where the notification of the slot number and the port number is not received (step St18: No), the unit control section 200 performs the determination in the step St18 again. In a case where the notification of the slot number and the port number is received (step St18: Yes), the unit control section 200 performs a processing operation in a step St15 described later. In other words, the unit control section 200 stands by until receiving the notification of the slot number and the port number.

Next, the unit control section 200 determines whether or not the slot number of the corresponding transmission processing unit 11 matches the slot number of the control communication transmission processing unit 11 (step St15). In other words, the unit control section 200 determines whether or not the corresponding transmission processing unit 11 is the control communication transmission processing unit 11.

In a case where the slot number of the corresponding transmission processing unit 11 does not match the slot number of the control communication transmission processing unit 11 (step St15: No), the unit control section 200 terminates the processing. In addition, in a case where the slot number of the corresponding transmission processing unit 11 matches the slot number of the control communication transmission processing unit 11 (step St15: Yes), the unit control section 200 notifies the transmission device 1, which serves as a connection destination of the port 25 of the determined port number, of the occurrence of the monitoring control system failure (step St16). At this time, the unit control section 200 causes information indicating the occurrence of the monitoring control system failure to be contained in the data area of the control frame and transmits the information.

Next, the unit control section 200 in the control communication transmission processing unit 11 generates and starts the virtual INF frame processing section 203 (step St17), and terminates the processing. In this way, the transmission processing unit 11 performs the processing when the monitoring control system failure occurs.

Figure 14:
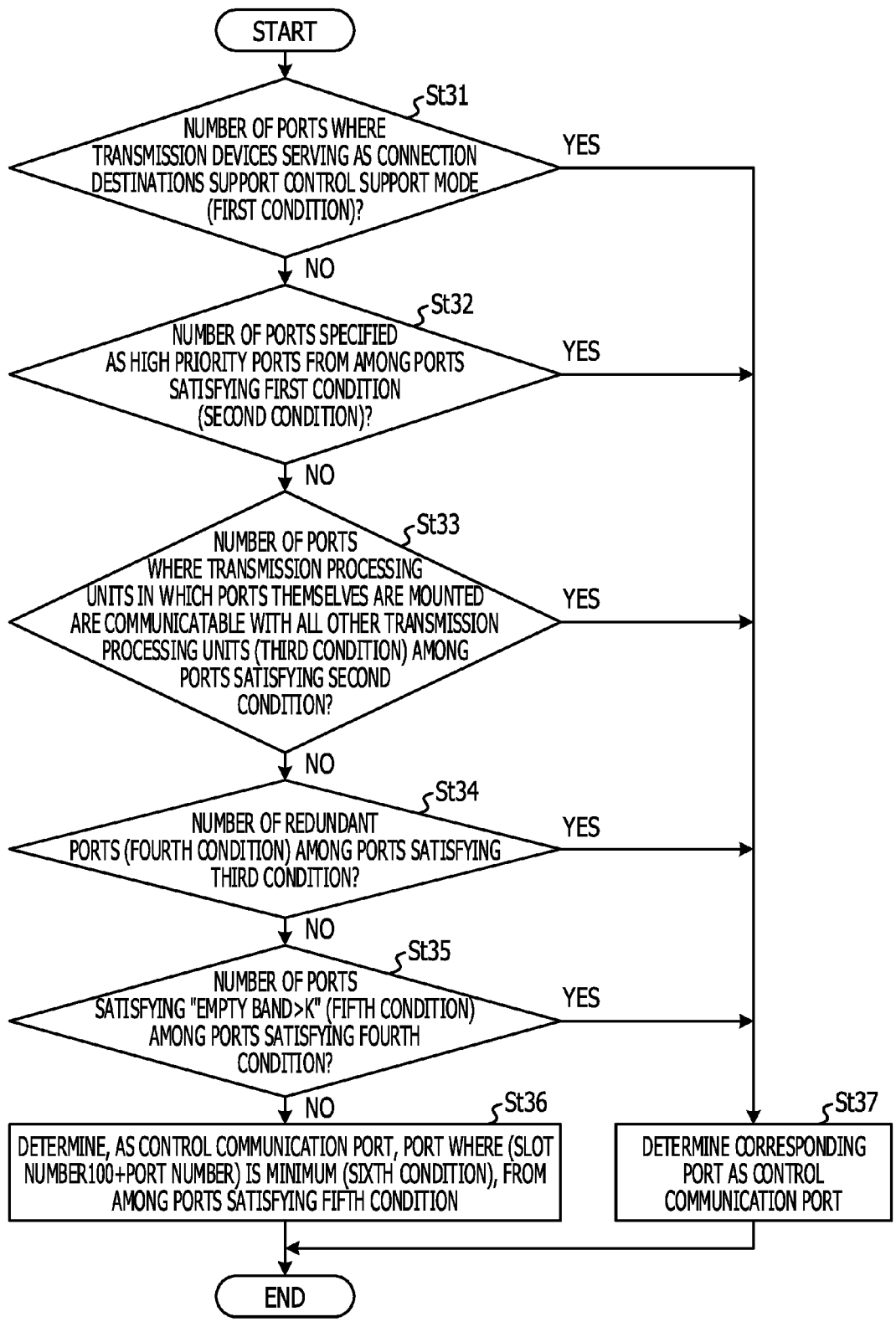
FIG. 14 is a flowchart illustrating an example of determination processing for a control communication transmission processing unit.

FIG. 14 is a flowchart illustrating an example of determination processing for the control communication transmission processing unit 11 (the above-mentioned step St13). While, as described above, the transmission processing unit 11 implemented in the slot of, for example, the minimum slot number performs this determination processing (see the above-mentioned step St12), the determination processing is not limited ti this.

As illustrated in FIG. 14, in accordance with first to sixth conditions whose priorities are different (the priority of the first condition>the priority of the second condition> . . . >the priority of the sixth condition), ports satisfying the individual conditions are sequentially selected from among all the ports of all the transmission processing units 11, and thus, the present processing is performed. In this way, the port 25 narrowed down to one is determined as a control communication port 25 that transmits and receives the monitoring control Ethernet frames, and one of the transmission processing units 11 in which the control communication port 25 is mounted is determined as the control communication transmission processing unit 11.

First, the unit control section 200 determines whether or not the number of the ports 25 where the transmission devices 1 serving as connection destinations support the control support mode (the first condition) is one (step St31). In a case where the number of the ports 25 satisfying the first condition is one (step St31: Yes), the unit control section 200 determines the corresponding port 25 as the control communication port 25 (step St37).

In a case where the number of the ports 25 satisfying the first condition is not one (step St31: No), the unit control section 200 determines whether or not the number of the ports 25 specified as high priority ports from among the ports 25 satisfying the first condition (the second condition) is one (step St32). Here, the specification of the high priority port is performed on the transmission processing unit 11 by, for example, the network management device 8, and the corresponding specification information is stored in the ROM 21.

In a case where the number of the ports 25 satisfying the second condition is one (step St32: Yes), the unit control section 200 determines the corresponding port 25 as the control communication port 25 (step St37).

In a case where the number of the ports 25 satisfying the second condition is not one (step St32: No), the unit control section 200 determines whether or not the number of the ports 25 where the transmission processing units 11 in which the ports 25 themselves are mounted are communicatable with all the other transmission processing units 11 (the third condition) is one among the ports 25 satisfying the second condition (step St33). At this time, through, for example, the in-device LAN 50, the unit control section 200 checks the availability of communication with all the other transmission processing units 11.

In a case where the number of the ports 25 satisfying the third condition is one (step St33: Yes), the unit control section 200 determines the corresponding port 25 as the control communication port 25 (step St37).

In a case where the number of the ports 25 satisfying the third condition is not one (step St33: No), the unit control section 200 determines whether or not the number of the redundant ports 25 (the fourth condition) is one among the ports 25 satisfying the third condition (step St34). Here, each of the redundant ports 25 is a port to perform communication on behalf of another port 25 in a case where the corresponding port 25 becomes unable to perform communication, owing to a transmission path failure. Therefore, in a case where one of the redundant ports 25 is used as the control communication port 25, an influence on the band of a user frame is reduced. In addition, by referencing, for example, port setting information stored in the ROM 21, the unit control section 200 determines the type of the port 25.

In a case where the number of the ports 25 satisfying the fourth condition is one (step St34: Yes), the unit control section 200 determines the corresponding port 25 as the control communication port 25 (step St37).

In a case where the number of the ports 25 satisfying the fourth condition is not one (step St34: No), the unit control section 200 determines whether or not the number of the ports 25 each satisfying "an empty band>K" (the fifth condition) is one among the ports 25 satisfying the fourth condition (step St35). Here, K is a predetermined value. In a case where one of the ports 25 satisfying the fourth condition is used as the control communication port 25, an influence on the band of the user frame is reduced.

In a case where the number of the ports 25 satisfying the fifth condition is one (step St35: Yes), the unit control section 200 determines the corresponding port 25 as the control communication port 25 (step St37).

In a case where the number of the ports 25 satisfying the fifth condition is not one (step St35: No), the unit control section 200 determines, as the control communication port 25, one of the corresponding ports 25 where (the slot number×100+the port number) is a minimum (the sixth condition) (step St36). In a case of, for example, the port (#3) of the transmission processing unit (#2) 11, the slot number×100+the port number=203 is satisfied. Since (the slot number×100+the port number) is an individual value for each port 25, only one of the ports 25 satisfies the sixth condition.

After that, the unit control section 200 terminates the processing, and the above-mentioned step St14 is performed. In this way, the determination processing for the control communication transmission processing unit 11 is performed.

Figure 15:
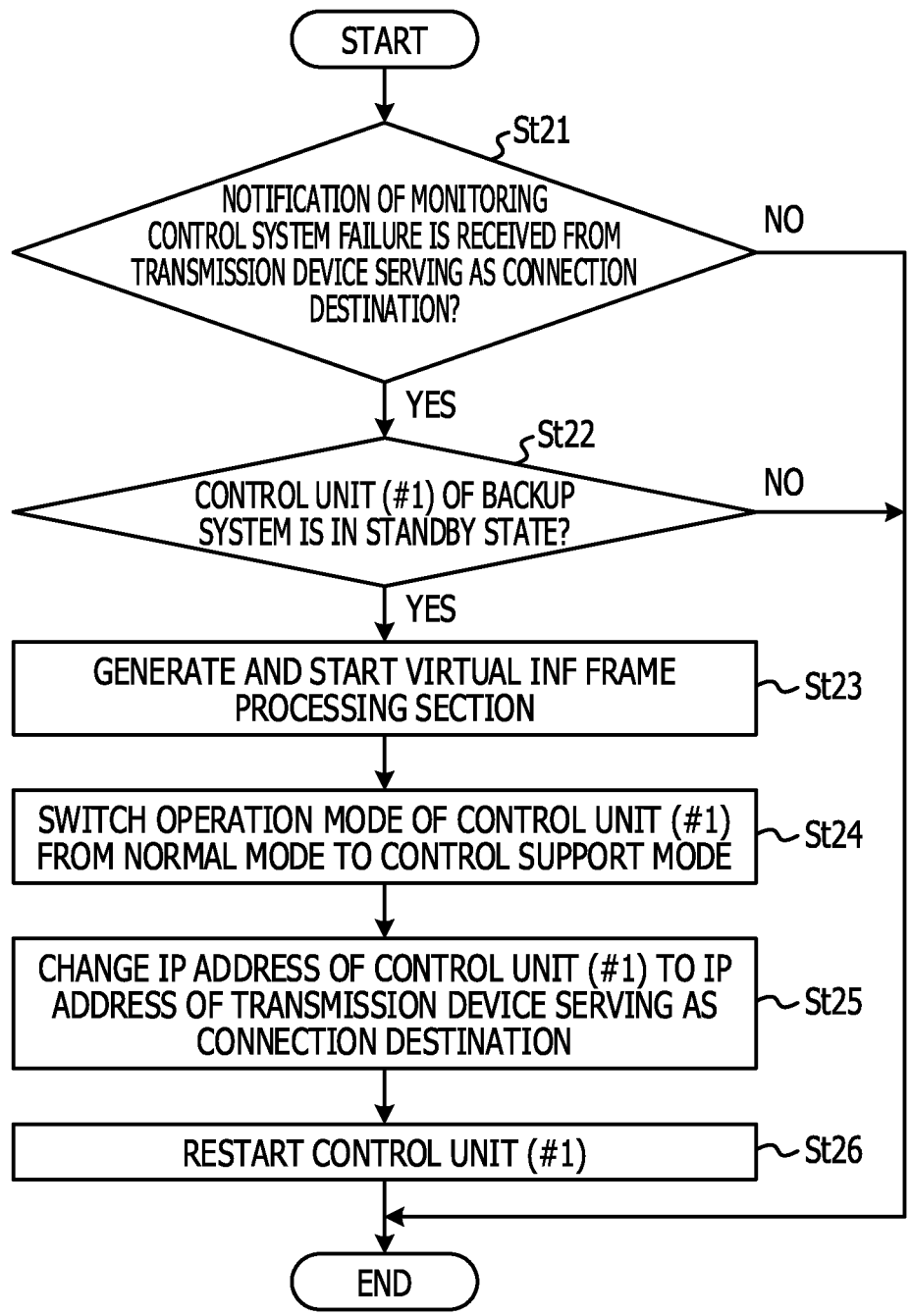
FIG. 15 is a flowchart illustrating examples of processing operations in control units and transmission processing units in a case where failures occur in both of control units in another transmission device.

FIG. 15 is a flowchart illustrating examples of processing operations in the control units 100 and 101 and the transmission processing units 11 in a case where failures occur in both of the control units 100 and 101 in another transmission device 1. In a case of the example in FIG. 1, this processing is performed in the transmission device 1 in the node A at, for example, predetermined time intervals.

The unit control section 200 determines whether or not a notification of a monitoring control system failure is received from the transmission device 1 serving as a connection destination (an adjacent node) (step St21). Here, the notification of a monitoring control system failure is contained in the control frame.

In a case where the notification of a monitoring control system failure is not received (step St21: No), the unit control section 200 terminates the processing. In addition, in a case where the notification of a monitoring control system failure is received (step St21: Yes), the unit control section 200 determines whether or not the control unit (#1) 101 of the backup system is in the standby state (step St22). In other words, the unit control section 200 determines whether or not the control unit (#1) 101 of the backup system performs monitoring control of the transmission processing units 11 within the same transmission device 1. The unit control section 200 confirms the state of the control unit (#1) 101 of the backup system, through the in-device LAN 50 or the in-device bus 51.

In a case where the control unit (#1) 101 of the backup system is not in the standby state (step St22: No), the unit control section 200 terminates the processing. In addition, in a case where the control unit (#1) 101 of the backup system is in the standby state (step St22: Yes), the unit control section 200 generates and starts the virtual interface frame processing section 203 (step St23).

Next, in the control unit (#1) 101 of the backup system, the control frame processing section 304 switches the operation mode of the control unit (#1) 101 from the normal mode to the control support mode (step St24). The switching of the operation mode is performed by changing, for example, operation mode setting information stored in the ROM 31.

Next, the control frame processing section 304 changes the IP address of the control unit (#1) 101 of the backup system, to the IP address of the transmission device 1 serving as a connection destination (the node B in the example of FIG. 1) in which the monitoring control system failure occurs (step St25). At this time, the control frame processing section 304 acquires the IP address of the transmission device 1 serving as a connection destination, from the address table (see FIGS. 11A to 11C). The IP address is stored in the ROM 31. In addition, in preparation for a case where the operation mode is returned from the control support mode to the normal mode (described later), the IP address before being changed is held in the ROM 31 without being deleted.

Next, the control frame processing section 304 restarts the control unit (#1) 101 of the backup system (step St26). In this way, the processing operations in the control units 100 and 101 and the transmission processing units 11 are performed.

By restarting the control unit (#1) 101 of the backup system, the IP address thereof becomes the same as that of the transmission device 1 in which the monitoring control system failure occurs, and the control unit (#1) 101 of the backup system operates in the control support mode. Accordingly, without changing the network configuration, it is possible for the network management device 8 to manage the transmission device 1 in which the monitoring control system failure occurs. In addition, by the restart, the CPU 30 in the control unit (#1) 101 of the backup system forms a virtual interface communication processing section 305 (see FIG. 17). As described later, the virtual interface communication processing section 305 transmits and receives inter-unit communication frames to and from the virtual interface frame processing section 203.

Figure 16:
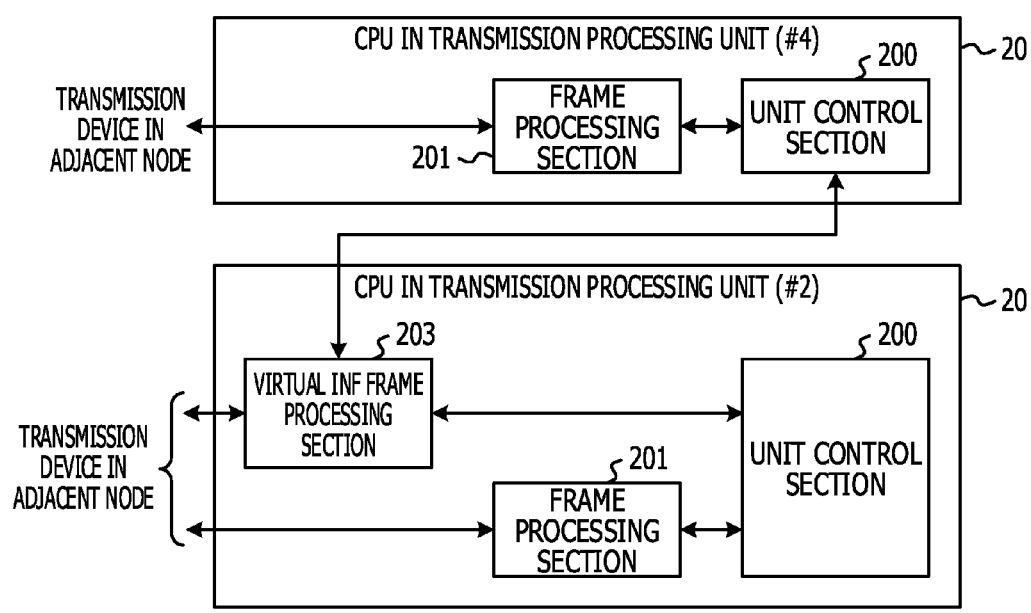
FIG. 16 is a configuration diagram illustrating examples of functional configurations of transmission processing units in a transmission device in which failures occur in both of control units.

FIG. 16 is a configuration diagram illustrating examples of the functional configurations of the transmission processing units 11 in the transmission device 1 in which failures occur in both of the control units 100 and 101. The configurations correspond to the configuration of the transmission device (second transmission device) 1 in the node B in which the monitoring control system failure occurs, in the example illustrated in FIG. 1. In FIG. 16, the same symbol is assigned to a configuration in common with FIG. 8, and the description thereof will be omitted. In addition, FIG. 16 exemplifies the configurations of the transmission processing unit (#2) (first transmission processing section) 11 determined as the control communication transmission processing unit and another transmission processing unit 11, and the illustration of the configurations of the control units 100 and 101 in which failures occur is omitted.

The CPU 20 in the transmission processing unit (#4) 11 includes the unit control section 200, and the frame processing section 201. The CPU 20 in the control communication transmission processing unit (#2) 11 includes the unit control section 200, the frame processing section 201, and the virtual interface (INF) frame processing section 203.

As described with reference to FIG. 13, when the monitoring control system failure is detected, the virtual INF frame processing section 203 is formed. The virtual INF frame processing section 203 transmits and receives the monitoring control Ethernet frames to and from the transmission device 1 in the adjacent node A.

The virtual INF frame processing section 203 transfers the monitoring control Ethernet frame, which is received from the transmission device 1 in the adjacent node A and includes a command message, to the unit control section 200 in the transmission processing unit 11 serving as a monitoring control target. In addition, the virtual INF frame processing section 203 causes a response message to be contained in the monitoring control Ethernet frame, the response message being received from the unit control section 200 in the transmission processing unit 11 serving as a monitoring control target, and the virtual INF frame processing section 203 transmits the response message to the transmission device 1 in the adjacent node A.

Figure 17:
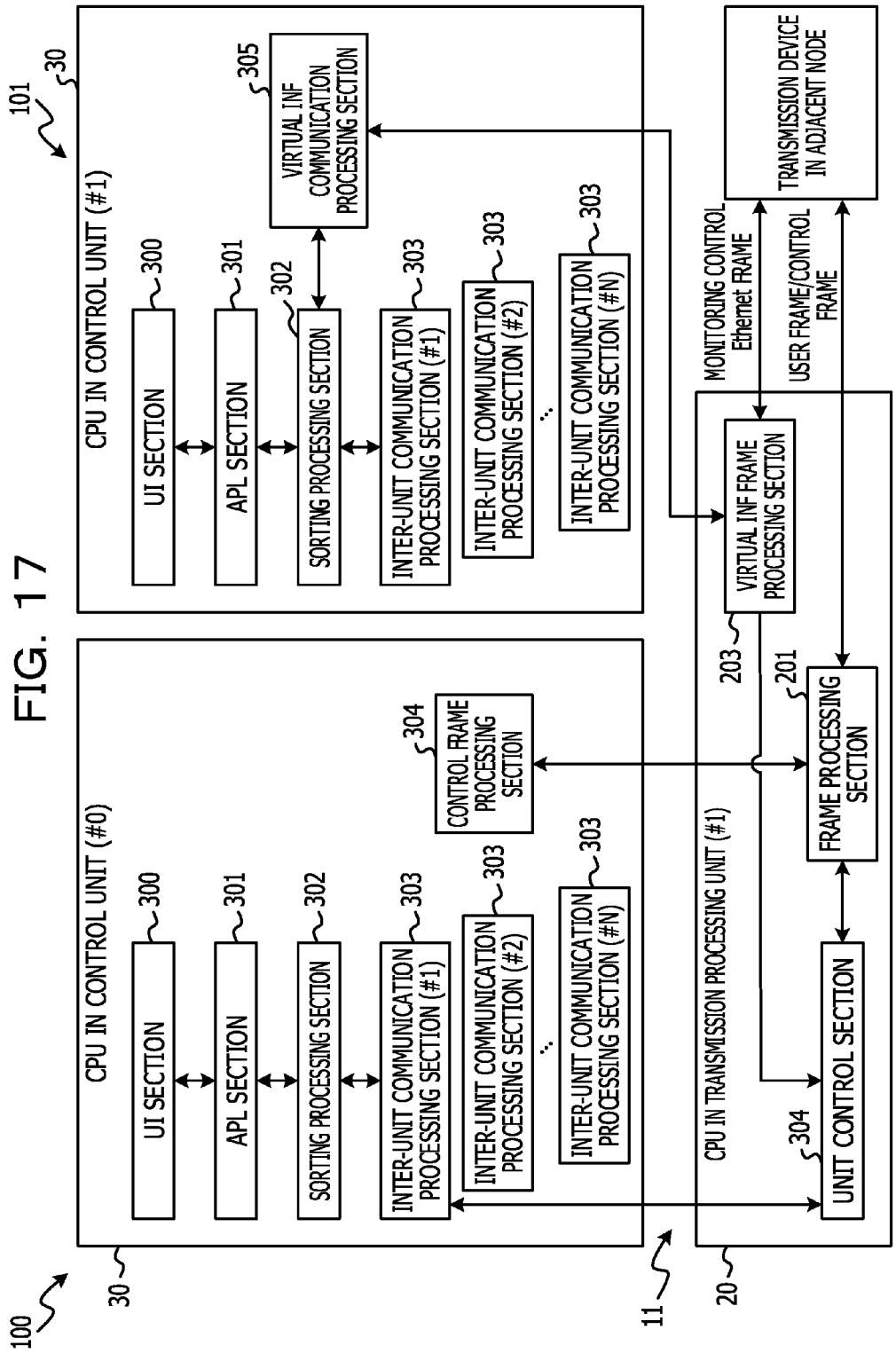
FIG. 17 is a configuration diagram illustrating examples of functional configurations of control units and a transmission processing unit in a case where failures occur in both of control units in a transmission device in an adjacent node.

FIG. 17 is a configuration diagram illustrating examples of the functional configurations of the control units 100 and 101 and the transmission processing unit 11 in a case where failures occur in both of the control units 100 and 101 in the transmission device 1 in an adjacent node. The configurations correspond to the configuration of the transmission device (first transmission device) 1 in the node A adjacent to the transmission device 1 in the node B in which the monitoring control system failure occurs, in the example illustrated in FIG. 1. In FIG. 17, the same symbol is assigned to a configuration in common with FIG. 8, and the description thereof will be omitted.

The CPU 30 in the control unit (second control section) (#1) 101 of the backup system includes the UI section 300, the APL section 301, the sorting processing section 302, the plural inter-unit communication processing sections (#1 to #N) 303, and the virtual interface (INF) communication processing section 305. The CPU 20 in the transmission processing unit (first transmission processing section) 11 includes the unit control section 200, the frame processing section 201, and the virtual INF frame processing section 203.

As described with reference to FIG. 15, the virtual INF frame processing section 203 and the virtual INF communication processing section 305 are formed when a monitoring control system failure occurs in the transmission device 1 in the adjacent node B. The virtual INF frame processing section 203 transmits and receives the monitoring control Ethernet frames to and from the transmission device 1 in the adjacent node B.

In a case of the control support mode, the control unit (#1) 101 of the backup system receives, from the network management device 8 through the communication processing section 34, a command addressed to the transmission device 1 in the node B in which the monitoring control system failure occurs. The UI section 300 outputs, to the APL section 301, information obtained by analyzing the command.

Based on the information input from the UI section 300, the APL section 301 generates a command message (control signal), and outputs the command message to the sorting processing section 302. The sorting processing section 302 analyzes the destination of the command message, and in a case where the destination is one of the transmission processing units 11 in the transmission device 1 in the node B, the sorting processing section 302 transfers the command message to the virtual INF communication processing section 305. In addition, the transferring of the command message is performed by, for example, the redirection function of the OS.

The virtual INF communication processing section 305 causes the command message to be contained in an inter-unit communication frame along with the destination unit ID and the transmission source unit ID, and transmits the command message to the virtual INF frame processing section 203 through the in-device LAN 50. The virtual INF frame processing section 203 causes the command message to be contained in the data area of a monitoring control Ethernet frame along with the destination unit ID and the transmission source unit ID, and transmits the command message to the control communication transmission processing unit 11 in the transmission device 1 in the adjacent node B.

As described above, in the transmission device 1 in the node B, the virtual INF frame processing section 203 in the control communication transmission processing unit 11 receives the monitoring control Ethernet frame. The virtual INF frame processing section 203 extracts the command message from the monitoring control Ethernet frame, and transfers the command message to the unit control section 200 in the transmission processing unit 11 indicated by the destination unit ID.

The unit control section 200 generates a response message (control signal) corresponding to the command message, and transfers the response message to the virtual INF frame processing section 203. The virtual INF frame processing section 203 causes the response message to be contained in the data area of a monitoring control Ethernet frame, and transmits the response message to one of the transmission processing units 11 in the transmission device 1 in the adjacent node A.

In the transmission device 1 in the node A, the virtual INF frame processing section 203 receives the monitoring control Ethernet frame transmitted from the control communication transmission processing unit 11 in the transmission device 1 in the node B. The virtual INF frame processing section 203 extracts the response message from the monitoring control Ethernet frame, causes the response message to be contained in an inter-unit communication frame along with the destination unit ID and the transmission source unit ID, and transmits the response message to the virtual INF communication processing section 305. After being routed through the sorting processing section 302, the APL section 301, and the UI section 300 in this order, the response message is transmitted to the network management device 8 through the communication processing section 34.

In this way, the control communication transmission processing unit (#2) 11 in the node B in which the monitoring control system failure occurs receives and transmits the command message and the response message from and to the transmission device 1 in the adjacent node A. In addition, the other transmission processing unit (#4) 11 receives and transmits a command message and a response message from and to the transmission device 1 in the adjacent node A through the control communication transmission processing unit (#2) 11.

In addition, in accordance with an instruction of the network management device 8, the control unit (#1) 101 of the backup system in the node A transmits and receives a command message and a response message to and from the control communication transmission processing unit (#2) 11 in the node B through the transmission processing unit (#1) 11. Accordingly, by the control unit (#1) 101 of the backup system in the transmission device 1 in the node A, interruption of monitoring control of the transmission device 1 in the node B in which the monitoring control system failure occurs is avoided.

(Example of Communication Routed through Virtual Interface)

Next, an example of communication routed through the above-mentioned virtual interface will be described.

Figure 18A:
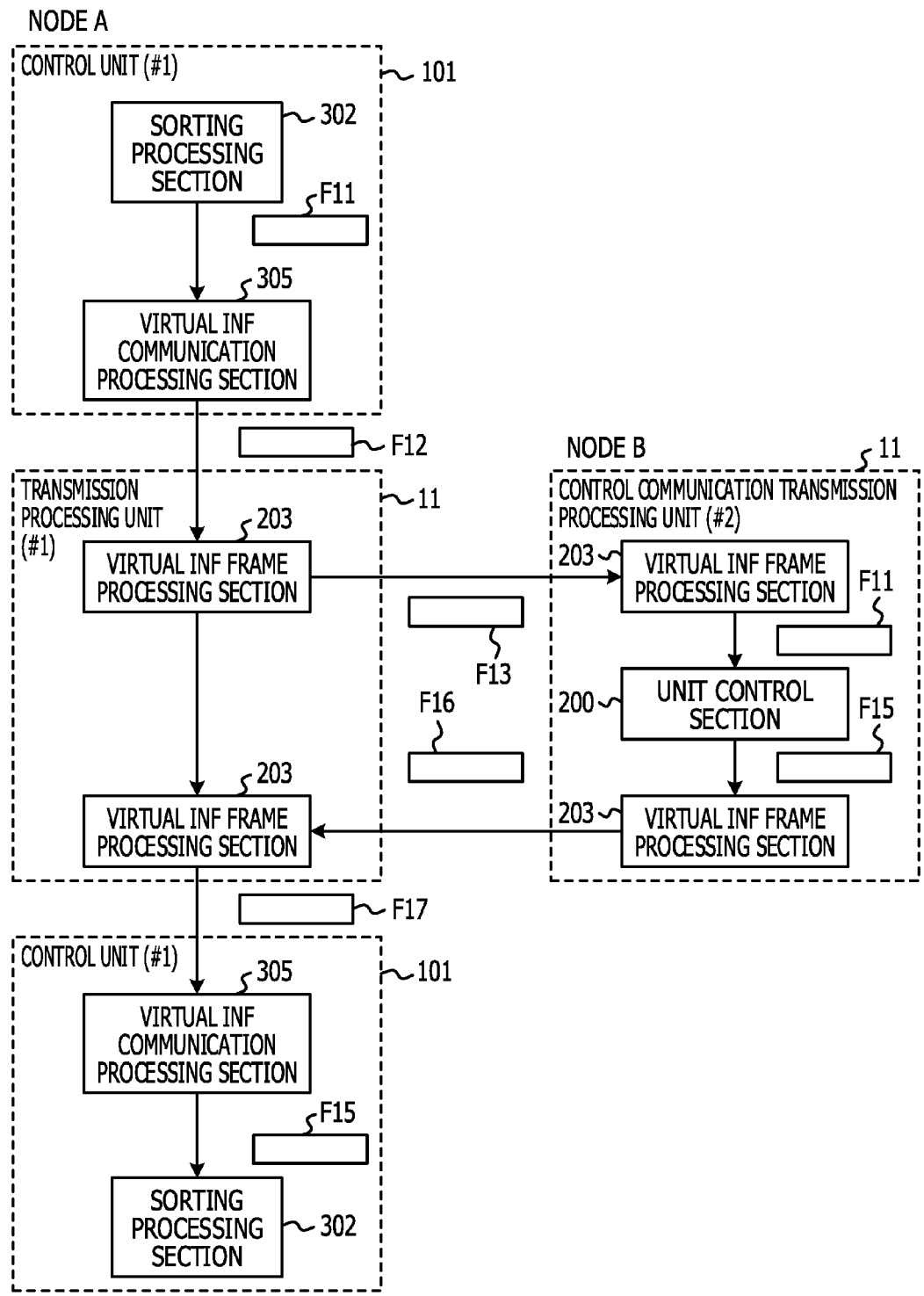
FIG. 18A is a diagram illustrating an example of communication between transmission devices through a virtual interface.
Figure 18B:
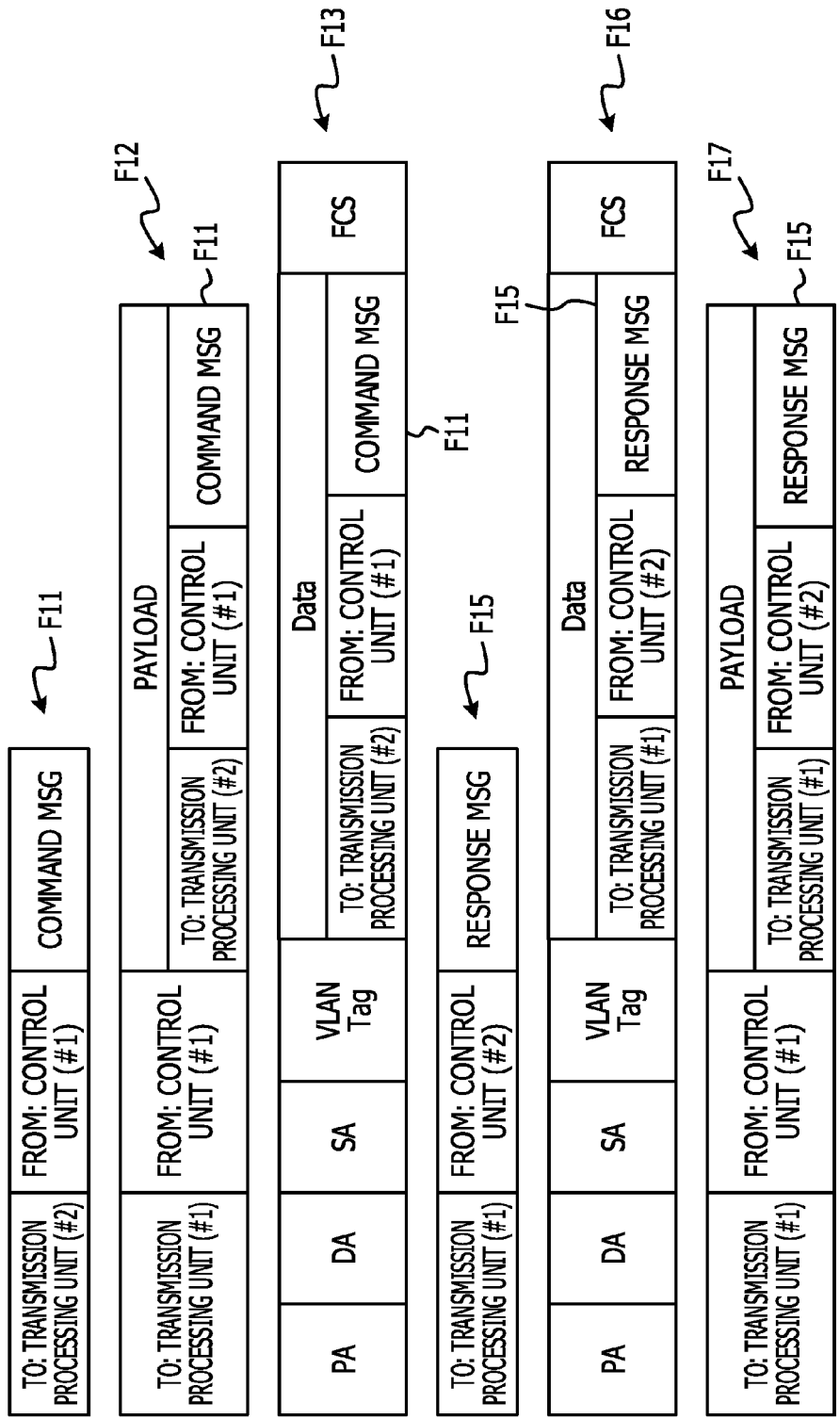
FIG. 18B is a configuration diagram illustrating frames illustrated in FIG. 18A.

FIG. 18A illustrates an example of communication between the transmission devices 1 through the virtual interface. FIG. 18A illustrates the flow of communication between the sorting processing section 302 in the control unit (#1) 101 in the node A and the unit control section 200 in the control communication transmission processing unit (#2) (first transmission processing section) 11 in the node B, in the configurations illustrated in FIG. 16 and FIG. 17. In addition, FIG. 18B is a configuration diagram illustrating frames F11 to F13 and F15 to F17 illustrated in FIG. 18A.

In a case where the inter-unit communication frame F11 addressed to the control communication transmission processing unit (#2) 11 in the node B is input from the APL section 301, the sorting processing section 302 in the transmission device 1 in the node A outputs the inter-unit communication frame F11 to the virtual INF communication processing section 305. In the inter-unit communication frame F11, the destination unit ID (see "TO:") indicates the ID of the control communication transmission processing unit (#2) 11 in the node B, and the transmission source unit ID (see "FROM:") indicates the ID of the control unit (#1)

101. The payload area of the inter-unit communication frame F11 contains a command message (command MSG).

The virtual INF communication processing section 305 causes the inter-unit communication frame F11 to be contained in the payload area of the inter-unit communication frame F12, and transfers the inter-unit communication frame F11 to the virtual INF frame processing section 203 in the transmission processing unit (#1) 11 through the in-device LAN 50. In the inter-unit communication frame F12, the destination unit ID (see "TO:") indicates the ID of the transmission processing unit (#1) 11, and the transmission source unit ID (see "FROM:") indicates the ID of the control unit (#1) 101. The payload area of the inter-unit communication frame F12 contains the inter-unit communication frame F11.

The virtual INF frame processing section 203 extracts the inter-unit communication frame F11 from the payload area of the inter-unit communication frame F12, and causes the inter-unit communication frame F11 to be contained in the data area of the monitoring control Ethernet frame F13. The virtual INF frame processing section 203 transmits the monitoring control Ethernet frame F13 to the transmission device 1 in the node B through the transmission path D.

In the transmission device 1 in the node B, the virtual INF frame processing section 203 in the control communication transmission processing unit (#2) 11 receives the monitoring control Ethernet frame F13, and extracts the inter-unit communication frame F11 from the monitoring control Ethernet frame F13. Since the destination unit ID of the inter-unit communication frame F11 is the control communication transmission processing unit (#2) 11, the virtual INF frame processing section 203 outputs the inter-unit communication frame F11 to the unit control section 200 in the control communication transmission processing unit (#2) 11.

The unit control section 200 extracts the command message from the inter-unit communication frame F11, and performs processing corresponding to the command message. As this processing, for example, the acquisition of communication state information or failure information may be cited.

The unit control section 200 generates, as an execution result of the command, a response message (response MSG), causes the response message to be contained in the payload area of the inter-unit communication frame F15, and outputs the response message to the virtual INF frame processing section 203. In the inter-unit communication frame F15, the destination unit ID (see "TO:") indicates the ID of the transmission processing unit (#1) 11 in the node A, and the transmission source unit ID (see "FROM:") indicates the ID of the control communication transmission processing unit (#2) 11. The payload area of the inter-unit communication frame F15 contains the response message.

The virtual INF frame processing section 203 causes the inter-unit communication frame F15 to be contained in the data area of the monitoring control Ethernet frame F16. The virtual INF frame processing section 203 transmits the monitoring control Ethernet frame F16 to the transmission device 1 in the node A through the transmission path D.

In the transmission device 1 in the node A, the virtual INF frame processing section 203 in the transmission processing unit (#1) 11 receives the monitoring control Ethernet frame F16, and extracts the inter-unit communication frame F15 from the monitoring control Ethernet frame F16. Since the destination unit ID of the inter-unit communication frame F15 is the ID of the transmission processing unit (#1) 11 in the node A, the virtual INF frame processing section 203 causes the inter-unit communication frame F15 to be contained in the payload area of the inter-unit communication frame F17.

In the inter-unit communication frame F17, the destination unit ID (see "TO:") indicates the ID of the control unit (#1) 101, and the transmission source unit ID (see "FROM:") indicates the ID of the transmission processing unit (#1) 11. The payload area of the inter-unit communication frame F17 contains the inter-unit communication frame F15. The virtual INF frame processing section 203 transfers the inter-unit communication frame F17 to the virtual INF communication processing section 305 in the control unit (#1) 101 through the in-device LAN 50.

The virtual INF communication processing section 305 extracts the inter-unit communication frame F15 from the inter-unit communication frame F17, and outputs the inter-unit communication frame F15 to the sorting processing section 302. The sorting processing section 302 extracts the response message from the inter-unit communication frame F15, and outputs the response message to the APL section 301. After that, the response message is transmitted from the UI section 300 to the network management device 8.

In this way, the command message and the response message (control signal) are contained in a frame (Ethernet frame) of the same format as the user frame serving as the main signal, and transmitted and received. In other words, the command message and the response message are encapsulated, and transmitted and received.

Accordingly, it is possible for the control unit (#1) 101 in the node A and the control communication transmission processing unit (#2) 11 in the node B to transmit and receive the command message and the response message through the in-device LAN 50 and the virtual interface whose communication methods are different from each other.

Figure 19A:
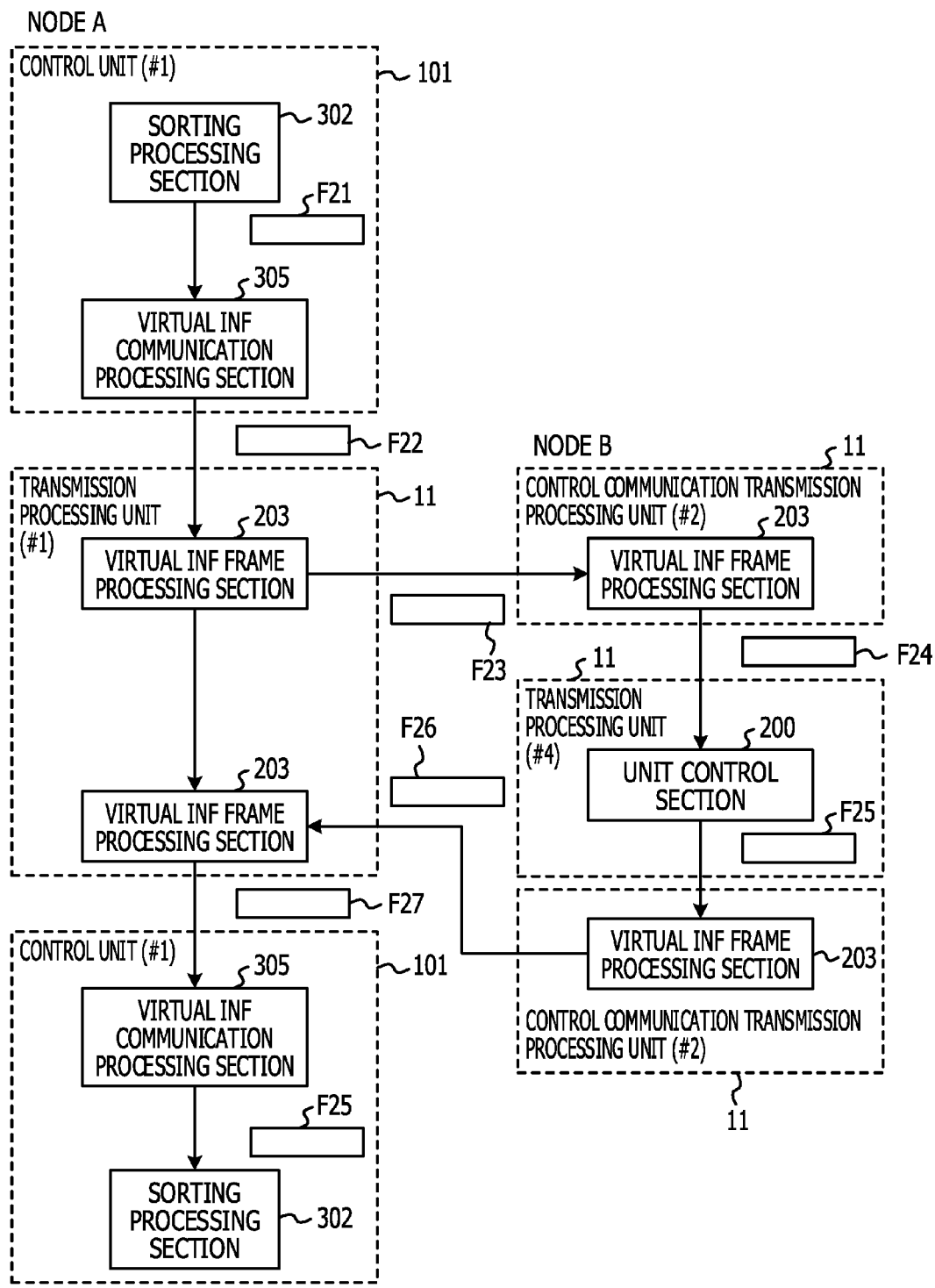
FIG. 19A is a diagram illustrating another example of communication between transmission devices through a virtual interface.

In addition, FIG. 19A illustrates another example of communication between the transmission devices 1 through the virtual interface. FIG. 19A illustrates the flow of communication between the sorting processing section 302 in the control unit (#1) 101 in the node A and the unit control section 200 in the transmission processing unit (#4) (second transmission processing section) 11 in the node B, in the configurations illustrated in FIG. 16 and FIG. 17. In addition, FIG. 19B is a configuration diagram illustrating frames F21 to F27 illustrated in FIG. 19A.

In a case where the inter-unit communication frame F21 addressed to the transmission processing unit (#4) 11 in the node B is input from the APL section 301, the sorting processing section 302 in the transmission device 1 in the node A outputs the inter-unit communication frame F21 to the virtual INF communication processing section 305. In the inter-unit communication frame F21, the destination unit ID (see "TO:") indicates the ID of the transmission processing unit (#4) 11 in the node B, and the transmission source unit ID (see "FROM:") indicates the ID of the control unit (#1) 101. The payload area of the inter-unit communication frame F21 contains a command message (command MSG).

The virtual INF communication processing section 305 causes the inter-unit communication frame F21 to be contained in the payload area of the inter-unit communication frame F22, and transfers the inter-unit communication frame F21 to the virtual INF frame processing section 203 in the transmission processing unit (#1) 11 through the in-device LAN 50. In the inter-unit communication frame F22, the destination unit ID (see "TO:") indicates the ID of the transmission processing unit (#1) 11, and the transmission source unit ID (see "FROM:") indicates the ID of the control unit (#1) 101. The payload area of the inter-unit communication frame F22 contains the inter-unit communication frame F21.

The virtual INF frame processing section 203 extracts the inter-unit communication frame F21 from the payload area of the inter-unit communication frame F22, and causes the inter-unit communication frame F21 to be contained in the data area of the monitoring control Ethernet frame F23. The virtual INF frame processing section 203 transmits the monitoring control Ethernet frame F23 to the transmission device 1 in the node B through the transmission path D.

In the transmission device 1 in the node B, the virtual INF frame processing section 203 in the control communication transmission processing unit (#2) 11 receives the monitoring control Ethernet frame F23, and extracts the inter-unit communication frame F21 from the monitoring control Ethernet frame F23. Since the destination unit ID of the inter-unit communication frame F21 is the transmission processing unit (#4) 11, the virtual INF frame processing section 203 generates the inter-unit communication frame F24 where the transmission source unit ID of the inter-unit communication frame F21 is changed.

In the inter-unit communication frame F24, the destination unit ID (see "TO:") indicates the ID of the transmission processing unit (#4) 11, and the transmission source unit ID (see "FROM:") indicates the ID of the control communication transmission processing unit (#2) 11. The payload area of the inter-unit communication frame F24 contains the command message (command MSG). The virtual INF frame processing section 203 outputs the inter-unit communication frame F24 to the unit control section 200 in the transmission processing unit (#4) 11 through the in-device LAN 50.

The unit control section 200 extracts the command message from the inter-unit communication frame F24, and performs processing corresponding to the command message. The unit control section 200 generates, as an execution result of the command, a response message (response MSG).

The unit control section 200 causes the response message to be contained in the payload area of the inter-unit communication frame F25, and transfers the response message to the virtual INF frame processing section 203 in the control communication transmission processing unit (#2) 11 through the in-device LAN 50. In the inter-unit communication frame F25, the destination unit ID (see "TO:") indicates the ID of the control communication transmission processing unit (#2) 11, and the transmission source unit ID (see "FROM:") indicates the ID of the transmission processing unit (#4) 11. The payload area of the inter-unit communication frame F25 contains the response message.

The virtual INF frame processing section 203 causes the inter-unit communication frame F25 to be contained in the data area of the monitoring control Ethernet frame F26. The virtual INF frame processing section 203 transmits the monitoring control Ethernet frame F26 to the transmission device 1 in the node A through the transmission path D.

In the transmission device 1 in the node A, the virtual INF frame processing section 203 in the transmission processing unit (#1) 11 receives the monitoring control Ethernet frame F26, and extracts the inter-unit communication frame F25 from the monitoring control Ethernet frame F26. Since the destination unit ID of the inter-unit communication frame F25 is the ID of the control communication transmission processing unit (#2) 11 in the node B, the virtual INF frame processing section 203 causes the inter-unit communication frame F25 to be contained in the payload area of the inter-unit communication frame F27.

In the inter-unit communication frame F27, the destination unit ID (see "TO:") indicates the ID of the control unit (#1) 101, and the transmission source unit ID (see "FROM:") indicates the ID of the transmission processing unit (#1) 11. The payload area of the inter-unit communication frame F27 contains the inter-unit communication frame F25. The virtual INF frame processing section 203 transfers the inter-unit communication frame F27 to the virtual INF communication processing section 305 in the control unit (#1) 101 through the in-device LAN 50.

The virtual INF communication processing section 305 extracts the inter-unit communication frame F25 from the inter-unit communication frame F27, and outputs the inter-unit communication frame F25 to the sorting processing section 302. The sorting processing section 302 extracts the response message from the inter-unit communication frame F25, and outputs the response message to the APL section 301. After that, the response message is transmitted from the UI section 300 to the network management device 8.

In the present example, the command message and the response message are transmitted and received in states of being encapsulated. Accordingly, it is possible for the control unit (#1) 101 in the node A and the transmission processing unit (#4) 11 in the node B to transmit and receive the command message and the response message through the in-device LAN 50 and the virtual interface whose communication methods are different from each other.

(Deletion Processing for Virtual Interface)

Figure 20:
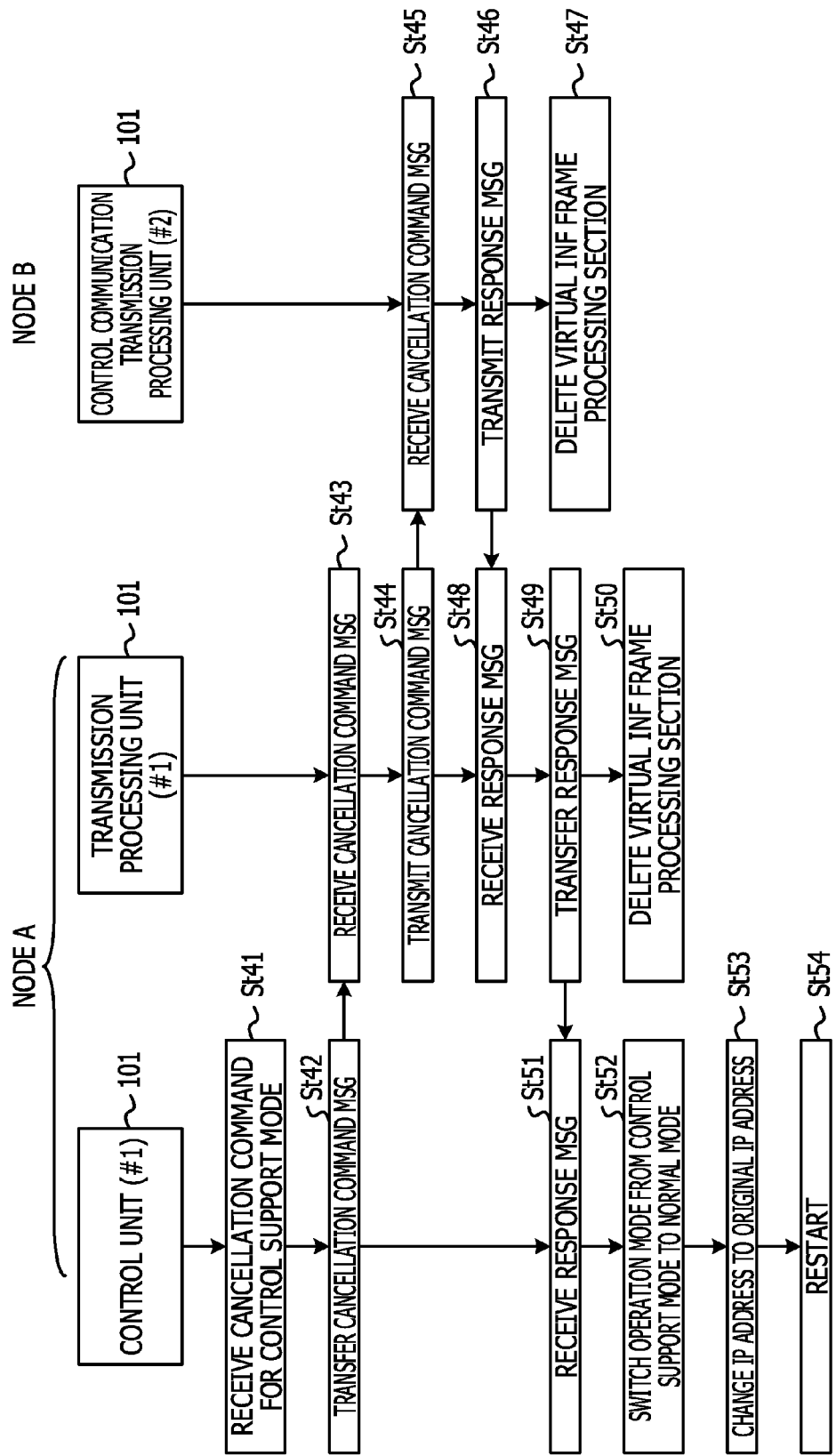
FIG. 20 is a ladder chart illustrating an example of deletion processing for a virtual interface.

FIG. 20 is a ladder chart illustrating an example of deletion processing for a virtual interface. The deletion processing for a virtual interface is performed with being triggered by the reception of a cancellation command for the control support mode from the network management device 8.

In the control unit (#1) 101 in the node A, the virtual INF communication processing section 305 receives the cancellation command for the control support mode, from the network management device 8 through the UI section 300, the APL section 301, and the sorting processing section 302 (step St41). The virtual INF communication processing section 305 causes a cancellation command message (MSG) to be contained in an inter-unit communication frame, and transfers the cancellation command message (MSG) to the virtual INF frame processing section 203 in the transmission processing unit (#1) 11 (step St42).

The virtual INF frame processing section 203 receives the cancellation command message (MSG) (step St43). The virtual INF frame processing section 203 causes the cancellation command message (MSG) to be contained in a monitoring control Ethernet frame, and transmits the cancellation command message (MSG) to the control communication transmission processing unit (#2) 11 in the node B through the transmission path D (step St44).

In the control communication transmission processing unit (#2) 11 in the node B, the virtual INF frame processing section 203 receives the cancellation command message (step St45). The unit control section 200 generates a response message (MSG), causes the response message (MSG) to be contained in a monitoring control Ethernet frame, and transmits the response message (MSG) to the transmission processing unit (#1) 11 in the node A through the transmission path D (step St46). After the transmission, the unit control section 200 stops and deletes the virtual INF frame processing section 203 (step St47).

In the transmission processing unit (#1) 11 in the node A, the virtual INF frame processing section 203 receives the response message (step St48). The virtual INF frame processing section 203 causes the response message to be contained in an inter-unit communication frame, and transfers the response message to the control unit (#1) 101 (step St49). After the transmission, the unit control section 200 stops and deletes the virtual INF frame processing section 203 (step St50). From this, the virtual interface is deleted.

In the control unit (#1) 101 in the node A, the virtual INF communication processing section 305 receives the response message (step St51). After the reception, the virtual INF communication processing section 305 switches the operation mode from the control support mode to the normal mode (step St52). The switching of the operation mode is performed by changing, for example, the operation mode setting information stored in the ROM 31.

Next, the virtual INF communication processing section 305 changes the IP address of the control unit (#1) 101 to the original IP address (step St53). Here, the original IP address is acquired from, for example, the ROM 31. In addition, the processing operation in the step St53 may be executed before the processing operation in the step St52.

Next, the virtual INF communication processing section 305 restarts the control unit (#1) 101 (step St54). From this, the virtual INF communication processing section 305 is deleted, and the control unit (#1) 101 operates in the normal mode. In this way, the deletion processing for the virtual interface is performed.

As described above, the transmission device (the transmission device in the node A) 1 according to an embodiment includes a transmission processing section (transmission processing unit) 11, a first control section (the control unit (#0) of the operational system) 100, and a second control section (the control unit (#1) of the backup system) 101. The transmission processing section 11 transmits and receives main signals (user frames) to and from another transmission device (the transmission device in the node B) 1 through the transmission path D.

By transmitting and receiving control signals (command messages and response messages) to and from the transmission processing section 11, the first control section 100 performs monitoring control of the transmission processing section 11. In a case where a failure occurs in the first control section 100, the second control section 101 performs the monitoring control of the transmission processing section 11, on behalf of the first control section 100.

In a case where a failure occurs in the monitoring control system of another transmission device 1, the second control section 101 transmits and receives control signals to and from the other transmission device 1 through the transmission processing section 11, and thus, performs monitoring control of the other transmission device 1.

Accordingly, in a case where a failure occurs in the monitoring control system of the other transmission device 1, it is possible for the transmission device 1 according to an embodiment to perform monitoring control of the other transmission device 1. Therefore, according to the transmission device 1 according to an embodiment, it is possible to avoid interruption of the monitoring control.

In addition, a transmission system according to an embodiment includes a first transmission device (the transmission device in the node A) 1 and a second transmission device (the transmission device in the node B) 1, connected to each other through the transmission path D, and the network management device 8 that manages the first transmission device and the second transmission device.

The first transmission device 1 includes a first transmission processing section (transmission processing unit) 11, a first control section (the control unit (#0) of the operational system) 100, and a second control section (the control unit (#1) of the backup system) 101. The first transmission processing section 11 transmits and receives main signals (user frames) to and from the second transmission device 1 through the transmission path D.

The first control section 100 performs monitoring control of the first transmission processing section 11. In a case where a failure occurs in the first control section 100, the second control section 101 performs the monitoring control of the first transmission processing section 11, on behalf of the first control section 100.

The second transmission device 1 includes a second transmission processing section (the control communication transmission processing unit) 11, a third control section (the control unit (#0) of the operational system) 100, and a fourth control section (the control unit (#1) of the backup system) 101. The second transmission processing section 11 transmits and receives main signals (user frames) to and from a transmission processing section 11 in the first transmission processing section 11 through the transmission path D.

By transmitting and receiving control signals (command messages and response messages) to and from the second transmission processing section 11, the third control section 100 performs monitoring control of the second transmission processing section 11. In a case where a failure occurs in the third control section 100, the fourth control section 101 performs the monitoring control of the second transmission processing section 11, on behalf of the third control section 100.

In a case where failures occur in both of the third control section 100 and the fourth control section 101, the second control section 101 performs monitoring control of the second transmission processing section 11 by transmitting and receiving control signals to and from the second transmission processing section 11 through the first transmission processing section 11 in accordance with an instruction of the network management device 8.

Since including the transmission device 1 according to an embodiment, the transmission system according to an embodiment achieves the same function effects as the above-mentioned contents.

In addition, a monitoring control method according to an embodiment is a method for utilizing a transmission device (the transmission device in the node A) 1 that includes a transmission processing section (transmission processing unit) 11, a first control section (the control unit (#0) of the operational system) 100, and a second control section (the control unit (#1) of the backup system) 101. The transmission processing section 11 transmits and receives main signals (user frames) to and from another transmission device (the transmission device in the node B) 1 through the transmission path D.

By transmitting and receiving control signals (command messages and response messages) to and from the transmission processing section 11, the first control section 100 performs monitoring control of the transmission processing section 11. In a case where a failure occurs in the first control section 100, the second control section 101 performs the monitoring control of the transmission processing section 11, on behalf of the first control section 100.

In a case where a failure occurs in the monitoring control system of another transmission device 1, the second control section 101 transmits and receives control signals to and from the other transmission device 1 through the transmission processing section 11, and thus, performs monitoring control of the other transmission device 1.

Since including the same configuration as that of the transmission device 1 according to an embodiment, the monitoring control method according to an embodiment achieves the same function effects as the above-mentioned contents.

While, as above, the contents of the present technology have been specifically described with reference to preferred embodiments, it is obvious that, based on the basic technical idea and the instruction of the present technology, those skilled in the art may adopt various modified embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A monitoring control method for utilizing a first transmission device including a transmission processing circuitry configured to transmit and receive signals to and from a second transmission device through a transmission path, a first processor configured to perform monitoring control of the transmission processing circuitry, and a second processor configured to perform monitoring control of the transmission processing circuitry on behalf of the first processor when a failure occurs in the first processor, and to be in a standby state when no failure occurs in the first processor, wherein the first and second processors are distinct, the first and second transmission devices are distinct, and the monitoring control method comprising:
   when failures occur in both a third processor and a fourth processor of the second transmission device that are distinct and that perform monitoring control of the second transmission device,
   performing, by the first transmission device,
      noticing the failures occurring in the third processor and the fourth processor of the second transmission device,
      determining whether the second processor is in the standby state, and,
      in response to noticing the failures and determining that the second processor is in the standby state, setting an address of the second processor to an address of the second transmission device so that the second processor monitors control of the second transmission device by transmitting and receiving control signals to and from the second transmission device on a basis of the address.

2. The monitoring control method according to claim 1, wherein
   the transmission processing circuitry transmits and receives, to and from the second transmission device, the control signals contained in frames of the same format as the signals.

3. A transmission device comprising:
   a transmission processing circuitry configured to transmit and receive signals to and from another transmission device through a transmission path;
   a first memory;
   a first processor coupled to the first memory, configured to perform monitoring control of the transmission processing circuitry;
   a second memory; and
   a second processor coupled to the second memory, configured to perform monitoring control of the transmission processing circuitry on behalf of the first processor when a failure occurs in the first processor, and to be in a standby state when no failure occurs in the first processor, wherein
   when failures occur in both a third processor and a fourth processor of the another transmission device that perform monitoring control of the another transmission device, the transmission device is configured to
      notice the failures occurring in the third processor and the fourth processor of the another transmission device and,
      in response to noticing the failures, and the second processor being in the standby state, set an address of the second processor to an address of the another transmission device so that the second processor performs monitoring control of the another transmission device by transmitting and receiving control signals to and from the another transmission device on a basis of the address,
   wherein the first and second processors are distinct, the third and fourth processors are distinct, and the transmission device and the another transmission device are distinct.

4. The transmission device according to claim 3, wherein
   the transmission processing circuitry transmits and receives, to and from the another transmission device, the control signals contained in frames of the same format as the signals.

5. A transmission system comprising:
   first and second transmission devices connected to each other through a transmission path; and
   a network management device configured to manage the first and second transmission devices, wherein
      the first transmission device includes
         a first transmission processing circuitry configured to transmit and receive signals to and from the second transmission device through the transmission path,
         a first memory,
         a first processor coupled to the first memory, configured to perform monitoring control of the first transmission processing circuitry,
         a second memory, and
         a second processor coupled to the second memory, configured to perform monitoring control of the first transmission processing circuitry on behalf of the first processor when a failure occurs in the first processor, and to be in a standby state when no failure occurs in the first processor, and
      the second transmission device includes
         a second transmission processing circuitry configured to transmit and receive the signals to and from the first transmission processing circuitry through the transmission path,
         a third memory,
         a third processor coupled to the third memory, configured to perform monitoring control of the second transmission processing circuitry by transmitting and receiving control signals to and from the second transmission processing circuitry, a fourth memory, and
a fourth processor coupled to the fourth memory, configured to perform monitoring control of the second transmission processing circuitry on behalf of the third processor when a failure occurs in the third processor, and the first transmission device is configured to, when failures occur in both of the third processor and the fourth processor, notice that the failures occurred in both of the third processor and the fourth processor, in response to noticing the failures, and the second processor being in the standby state, set an address of the second processor to an address of the second transmission device so that the second processor performs monitoring control of the second transmission processing circuitry by transmitting and receiving the control signals to and from the second transmission processing circuitry through the first transmission processing circuitry on a basis of the address in accordance with an instruction of the network management device, wherein the first and second processors are distinct, the third and fourth processors are distinct, and the first and second transmission devices are distinct.

6. The transmission system according to claim 5, wherein the first transmission processing circuitry transmits and receives, to and from the second transmission device, the control signals contained in frames of the same format as the signals.

* * * * *